(12) United States Patent
Takato

(10) Patent No.: US 7,391,968 B2
(45) Date of Patent: Jun. 24, 2008

(54) FINDER OPTICAL SYSTEM FOR A SINGLE-LENS REFLEX CAMERA

(75) Inventor: Hideyasu Takato, Hino (JP)

(73) Assignee: Olympus Corporation, Tokyo (JP)

( * ) Notice: Subject to any disclaimer, the term of this patent is extended or adjusted under 35 U.S.C. 154(b) by 313 days.

(21) Appl. No.: 11/184,994

(22) Filed: Jul. 20, 2005

(65) Prior Publication Data

US 2006/0024044 A1    Feb. 2, 2006

(30) Foreign Application Priority Data

Jul. 29, 2004    (JP)    ............... 2004-222263
Oct. 13, 2004    (JP)    ............... 2004-298431
Nov. 11, 2004    (JP)    ............... 2004-327931

(51) Int. Cl.
     *G03B 13/08*    (2006.01)
(52) U.S. Cl. ............ 396/386; 396/382; 359/345; 359/643; 359/645; 359/791
(58) Field of Classification Search ............... 396/382, 396/386; 359/345, 643, 645, 791
     See application file for complete search history.

(56) References Cited

U.S. PATENT DOCUMENTS

| 4,947,198 | A |   | 8/1990  | Inanobe et al. |
| 5,034,763 | A |   | 7/1991  | Inabata |
| 5,066,115 | A | * | 11/1991 | Sugawara ............ 359/676 |
| 5,946,505 | A | * | 8/1999  | Lee .................... 396/152 |
| 6,137,963 | A |   | 10/2000 | Morisawa et al. |
| 6,253,033 | B1 | * | 6/2001 | Hasushita ............ 396/382 |
| 6,692,163 | B2 | * | 2/2004 | Ogata ................. 396/354 |
| 2004/0005148 | A1 | * | 1/2004 | Ogata ................. 396/354 |

FOREIGN PATENT DOCUMENTS

| EP | 1 056 280 A2 | 11/2000 |
| JP | 63-135914    | 6/1986  |
| JP | 01-108516    | 4/1989  |
| JP | 2003-307764  | 10/2003 |

* cited by examiner

*Primary Examiner*—W. B. Perkey
*Assistant Examiner*—Warren K Fenwick
(74) *Attorney, Agent, or Firm*—Kenyon & Kenyon LLP

(57) ABSTRACT

An eyepiece includes, in order from the object side, a first lens with positive power, a second lens with positive power, and a third lens with negative power. The first lens is a positive meniscus lens with a convex surface facing the object side, and the eyepiece fails to have a fourth lens. The eyepiece satisfies the following conditions:

$0.6 < f1/f < 1.2$ $-2.0 < f1\text{-}2/f3 < -1.0$ $-0.45 < f3/f < -0.25$ where f1 is the focal length of the first lens; f1-2 is a combined focal length of the first and second lenses and is a focal length where a diopter is $-1\ \mathrm{m}^{-1}$ when the focal length of the eyepiece is changed; f3 is the focal length of the third lens; and f is the focal length of the entire system of the eyepiece and is a focal length where a diopter is $-1\ \mathrm{m}^{-1}$ when the focal length of the eyepiece is changed.

8 Claims, 15 Drawing Sheets

FIG.2A SPHERICAL ABERRATION PUPIL RADIUS 4mm

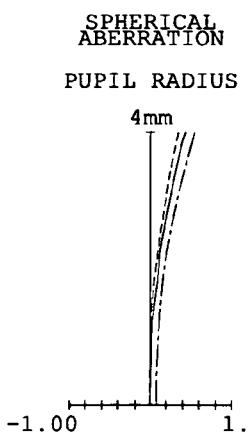

FIG.2B ASTIGMATISM HALF ANGLE OF VIEW OF EMERGENCE 12.9°

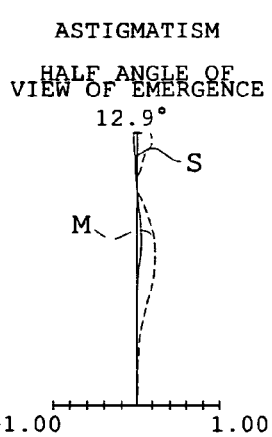

FIG.2C DISTORTION HALF ANGLE OF VIEW OF EMERGENCE 12.9°

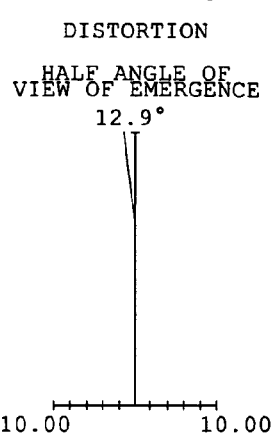

FIG.2D CHROMATIC ABERRATION OF MAGNIFICATION HALF ANGLE OF VIEW OF EMERGENCE 12.9°

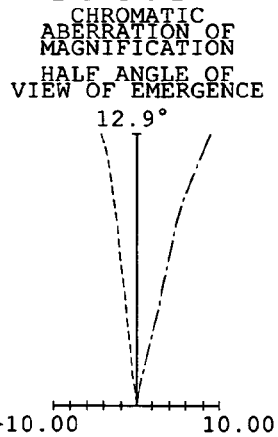

FIG.2E SPHERICAL ABERRATION PUPIL RADIUS 4mm

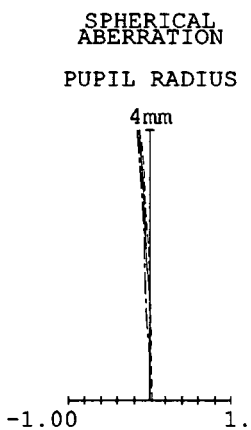

FIG.2F ASTIGMATISM HALF ANGLE OF VIEW OF EMERGENCE 11.9°

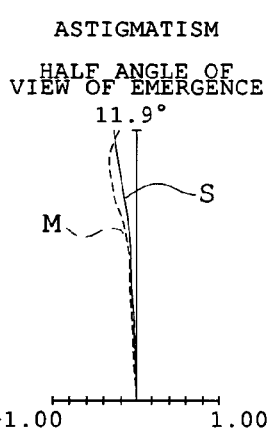

FIG.2G DISTORTION HALF ANGLE OF VIEW OF EMERGENCE 11.9°

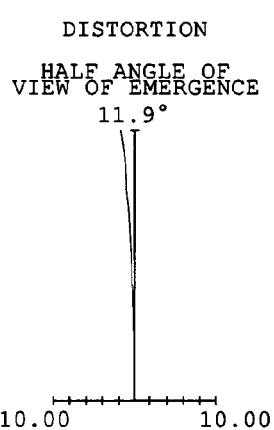

FIG.2H CHROMATIC ABERRATION OF MAGNIFICATION HALF ANGLE OF VIEW OF EMERGENCE 11.9°

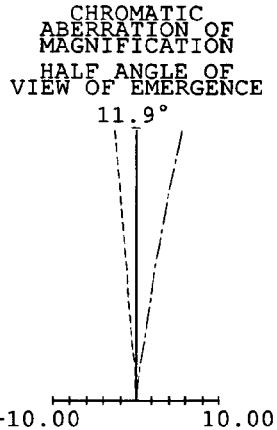

FIG.2I SPHERICAL ABERRATION PUPIL RADIUS 4mm

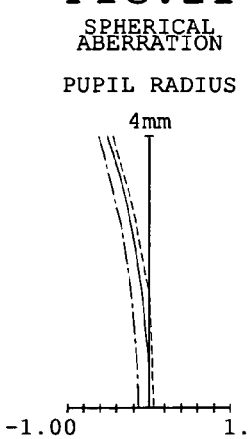

FIG.2J ASTIGMATISM HALF ANGLE OF VIEW OF EMERGENCE 10.9°

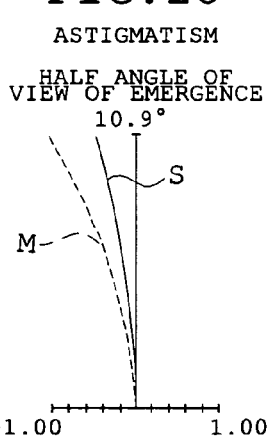

FIG.2K DISTORTION HALF ANGLE OF VIEW OF EMERGENCE 10.9°

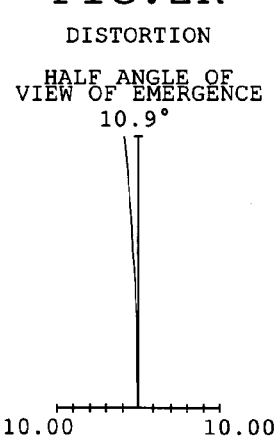

FIG.2L CHROMATIC ABERRATION OF MAGNIFICATION HALF ANGLE OF VIEW OF EMERGENCE 10.9°

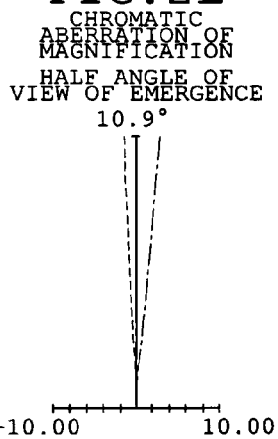

—·—·— 486.13
—————— 656.27
——————— 587.56

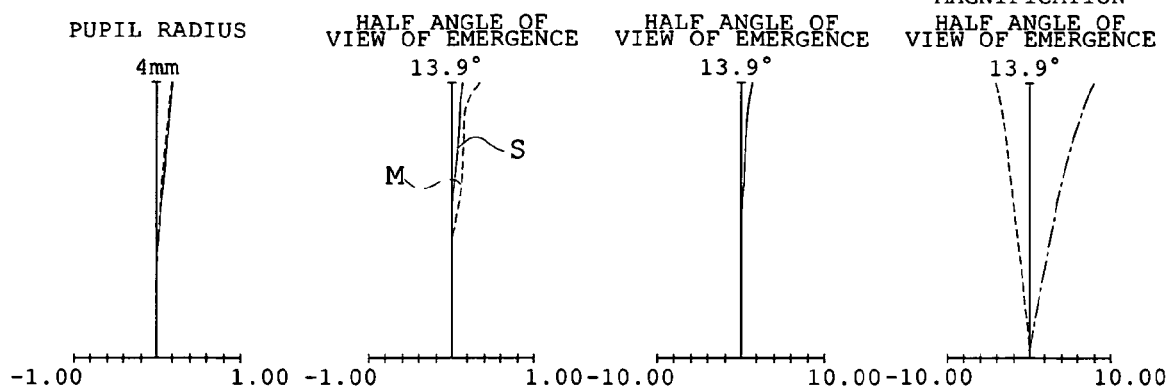
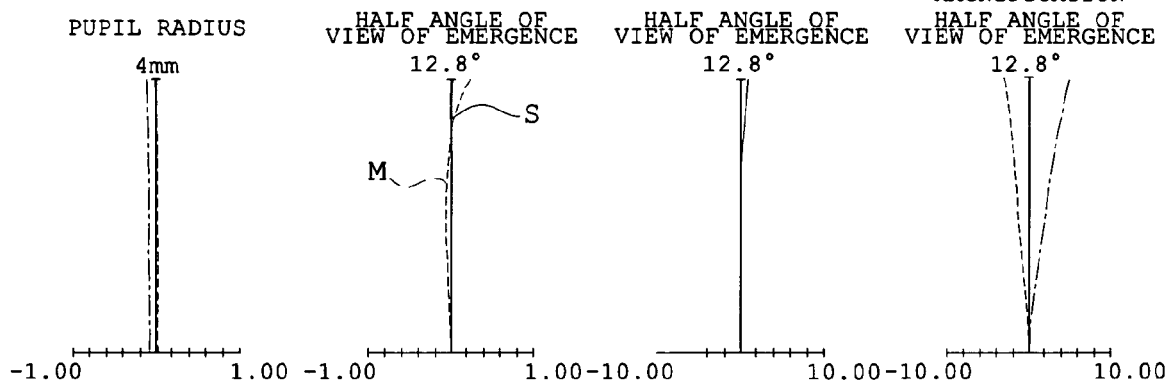
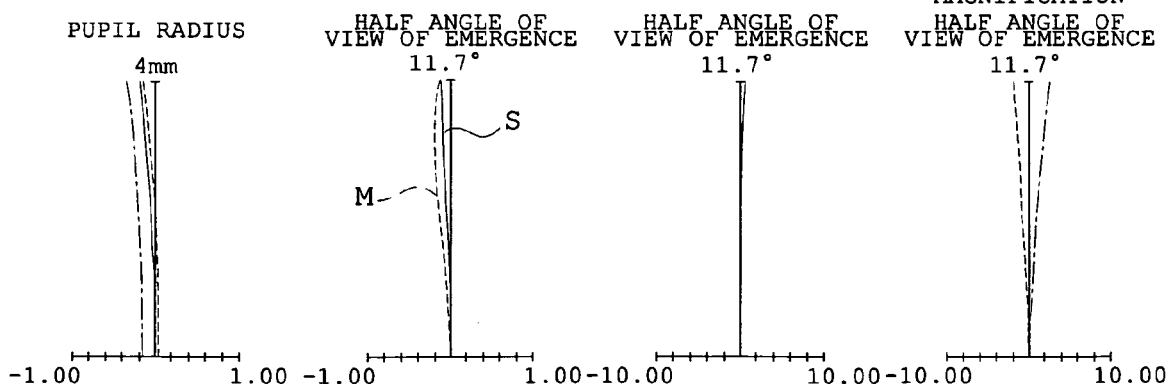

FIG.6A SPHERICAL ABERRATION PUPIL RADIUS 4mm

FIG.6B ASTIGMATISM HALF ANGLE OF VIEW OF EMERGENCE 14.5°

FIG.6C DISTORTION HALF ANGLE OF VIEW OF EMERGENCE 14.5°

FIG.6D CHROMATIC ABERRATION OF MAGNIFICATION HALF ANGLE OF VIEW OF EMERGENCE 14.5°

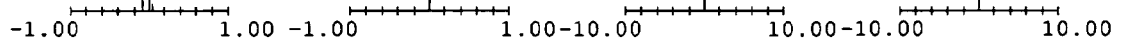

FIG.6E SPHERICAL ABERRATION PUPIL RADIUS 4mm

FIG.6F ASTIGMATISM HALF ANGLE OF VIEW OF EMERGENCE 13.3°

FIG.6G DISTORTION HALF ANGLE OF VIEW OF EMERGENCE 13.3°

FIG.6H CHROMATIC ABERRATION OF MAGNIFICATION HALF ANGLE OF VIEW OF EMERGENCE 13.3°

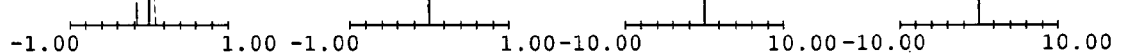

FIG.6I SPHERICAL ABERRATION PUPIL RADIUS 4mm

FIG.6J ASTIGMATISM HALF ANGLE OF VIEW OF EMERGENCE 12.2°

FIG.6K DISTORTION HALF ANGLE OF VIEW OF EMERGENCE 12.2°

FIG.6L CHROMATIC ABERRATION OF MAGNIFICATION HALF ANGLE OF VIEW OF EMERGENCE 12.2°

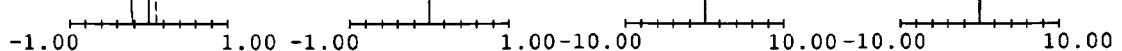

—·—·— 486.13
— — — 656.27
——— 587.56

FINDER OPTICAL SYSTEM FOR A SINGLE-LENS REFLEX CAMERA

This application claims benefits of Application Nos. 2004-222263 filed in Japan on Jul. 29, 2004; 2004-298431 filed in Japan on Oct. 13, 2004; and 2004-327931 filed in Japan on Nov. 11, 2004, the contents of which are hereby incorporated by reference.

BACKGROUND OF THE INVENTION

1. Field of the Invention

The invention relates to an eyepiece and a finder optical system, and in particular, to a finder for a single-lens reflex camera suitable for a camera that has a frame size of about a half of the diagonal length of a so-called 35 mm silver-halide film, and a digital single-lens reflex camera.

2. Description of Related Art

Recently, special attention has been devoted to digital cameras as an alternative to so-called 35 mm silver-halide film cameras. Sizes of CCDs used as image sensors of such digital cameras usually range from a fraction to a few tenths in diagonal length, compared with those of 35 mm silver-halide films. When the eyepiece of a conventional silver-halide film camera is used as it is in a camera that has such a small frame size, an observation image is reduced in size. Thus, in the case where a single-lens reflex system is introduced into the camera of this type, it is necessary to increase the magnification of a finder in order to facilitate image viewing.

Here, in order to increase the magnification of the finder, the focal length of the eyepiece must be reduced. In general, however, when the focal length of the eyepiece is reduced, a distance from a surface to be observed (a real image of an object) to the eyepiece (this distance is hereinafter referred to as a back focus) becomes short.

On the other hand, in order to provide a finder that is easy to see, it is necessary that a distance from the eyepiece to an observer's pupil, namely, a so-called eyepoint distance, is long and eclipse is practically eliminated. Generally, in order to ensure a long eyepoint distance, there is the need to increase the diameter of the eyepiece and to enlarge an effective aperture of the exit surface of an image inverting optical member. As a result of oversizing of the image inverting optical member, a developed optical path length in a prism or a mirror is increased. That is, a long back focus is required to obtain a high eyepoint.

As mentioned above, a high finder magnification is obtained and at the same time, various optical members such as prisms and mirrors can be arranged. In order to realize a high-eyepoint eyepiece, it is essential to ensure a long back focus, in spite of a short focal length.

Prior art examples of eyepieces where the back focus is longer than the focal length are disclosed in References 1-3 shown below.

Reference 1: Japanese Patent Publication No. Hei 7-107581
Reference 2: Japanese Patent No. 2726261
Reference 3: Japanese Patent Kokai No. Hei 2-304409

A finder optical system for common single-lens reflex cameras is fundamentally designed so that a light beam is reflected upward by a main mirror, for example, a quick-return mirror, provided on the optical path of a photographing optical system; a primary imaging plane for forming an object image turned left to right and inverted is provided; and the image is turned through prisms or mirrors into an erect image. The quick-return mirror is removed outside a photographing optical path in photography, and the light beam of the object image is conducted to an imaging surface so that photography is performed.

Techniques that the finder optical systems for conventional single-lens reflex cameras are fundamentally designed are disclosed, for example, in References 4-7 described below.

Reference 4: Japanese Patent Kokai No. Hei 01-185622
Reference 5: Japanese Patent Kokai No. Hei 10-197914
Reference 6: Japanese Patent Kokai No. 2003-307764
Reference 7: Japanese Patent Kokai No. 2001-8066

Reference 4 proposes the technique that an image formed in a Porro prism located behind a quick-return mirror by light transmitted through the quick-return mirror provided on the optical path of a photographing optical system is optically equivalent to an object image turned left to right and inverted that is formed on an imaging surface by light reflected by the quick-return mirror.

Reference 5 proposes the technique that after light is reflected upward by the quick-return mirror provided on the optical path of the photographing optical system, an erect image formed by turning an image by the Porro prism is equivalent to an image formed by light transmitted through the quick-return mirror.

Reference 6 proposes the technique that light is reflected upward by the quick-return mirror provided on the optical path of the photographing optical system, and after being reflected by a pellicle mirror, is further reflected by a roof prism or a roof mirror, and thereby an image to be observed is equivalent to an image formed on the imaging surface by light transmitted through the quick-return mirror.

Reference 7 proposes the technique that light is reflected upward by a first beam splitter provided on the optical path of the photographing optical system and is further reflected by a second beam splitter provided in the upper portion, and an object image thus obtained through an eyepiece is equivalent to an image formed by light transmitted through the first beam splitter.

On the other hand, where the finder optical system, such as that of the single-lens reflex camera set forth in each of References 4-6 or that of the digital single-lens reflex camera set forth in Reference 7, is fundamentally designed, an image turned by the prism is formed as the erect image, and thus light is once reflected toward the object side to form the erect image.

When AE (automatic exposure) and an optical system such as an imaging optical system are provided, it is necessary to ensure sufficient space for them.

The digital single-lens reflex camera that uses a large-sized CCD of 4/3 in., APS size, or 35 mm full size, mainly adopted in this type of camera, fails to have a through image function (the function of observing an object through an electronic finder in an LCD) that is common in a compact digital camera.

SUMMARY OF THE INVENTION

The eyepiece according to the present invention comprises, in order from the object side, a first lens with positive power, a second lens with positive power, and a third lens with negative power. The first lens is a positive meniscus lens with a convex surface facing the object side. The eyepiece fails to have a fourth lens and satisfies the following conditions:

$$0.6 < f1/f < 1.2$$

$$-2.0 < f1\text{-}2/f3 < -1.0$$

$$-0.45 < f3/f < -0.25$$

where f1 is the focal length of the first lens; f1-2 is a combined focal length of the first and second lenses and is a focal length where a diopter is −1 m$^{-1}$ when the focal length of the eyepiece is changed; f3 is the focal length of the third lens; and f is the focal length of the entire system of the eyepiece and is a focal length where a diopter is −1 m$^{-1}$ when the focal length of the eyepiece is changed.

The finder optical system according to the present invention comprises an image forming section forming an image of an object and the eyepiece for observing the image. The eyepiece includes, in order from the object side toward the pupil side, a first lens with positive power, a second lens with positive power, and a third lens with negative power. The first lens is a positive meniscus lens with a convex surface facing the object side. The eyepiece fails to have a fourth lens and satisfies the following condition:

$$2.5 < fb/Y < 4.0$$

where fb is an equivalent-air medium length (mm) from the image surface of the object to the entrance surface of the first lens and Y is a diagonal length (mm) of the image plane of the object in the image forming section.

The digital single-lens reflex camera according to the present invention comprises an image sensor converting an image of an object formed on its imaging surface into an electric signal and an observation optical system for observing an intermediate image of the object formed at a position nearly equivalent to the imaging surface. When a light ray incident perpendicularly on the center of the image sensor is thought of as an incident optical axis and a plane containing the incident optical axis on a reflecting surface and a bent optical axis is thought of as an optical axis incident plane, the observation optical system includes an image inverting optical system including a first reflecting surface, a second reflecting surface, a third reflecting surface, a fourth reflecting surface, and an eyepiece placed on the optical axis bent by the fourth reflecting surface. The first reflecting surface is placed on the incident optical axis of the image sensor to bend the incident optical axis in the horizontal direction of the camera. The second reflecting surface is placed on the optical axis bent by the first reflecting surface and in a direction in which the optical axis incident plane of the second reflecting surface intersects with that of the first reflecting surface. The third reflecting surface is placed on the optical axis bent by the second reflecting surface so that the optical axis bent by the second reflecting surface is bent in a direction opposite to the traveling direction of an incident ray on the second reflecting surface and nearly parallel to the optical axis bent by the first reflecting surface. The fourth reflecting surface is placed on the optical axis bent by the third reflecting surface so that the optical axis bent by the third reflecting surface is bent in the same direction as the traveling direction of the incident ray on the first reflecting surface and nearly parallel to the incident optical axis on the first reflecting surface. The digital single-lens reflex camera further comprises a path-splitting surface placed on the optical path from the first reflecting surface to the fourth reflecting surface in the image inverting optical system, and an imaging optical system and a light-receiving element or a light-emitting element, placed on one of optical paths split by the path-splitting surface.

These and other features and advantages of the present invention will become apparent from the following detailed description of the preferred embodiments when taken in conjunction with the accompanying drawings.

BRIEF DESCRIPTION OF THE DRAWINGS

FIGS. 2A, 2B, 2C, and 2D are diagrams showing aberration characteristics in the first embodiment where a diopter is +1.5 m$^{-1}$;

FIGS. 2E, 2F, 2G and 2H are diagrams showing aberration characteristics in the first embodiment where the diopter is −1 m$^{-1}$;

FIGS. 2I, 2J, 2K, and 2L are diagrams showing aberration characteristics in the first embodiment where the diopter is −3.5 m$^{-1}$;

FIGS. 4A, 4B, 4C, and 4D are diagrams showing aberration characteristics in the second embodiment where the diopter is +1 m$^{-1}$;

FIGS. 4E, 4F, 4G and 4H are diagrams showing aberration characteristics in the second embodiment where the diopter is −1 m$^{-1}$;

FIGS. 4I, 4J, 4K, and 4L are diagrams showing aberration characteristics in the second embodiment where the diopter is −3 m$^{-1}$;

FIGS. 6A, 6B, 6C, and 6D are diagrams showing aberration characteristics in the third embodiment where the diopter is +1 m$^{-1}$;

FIGS. 6E, 6F, 6G, and 6H are diagrams showing aberration characteristics in the third embodiment where the diopter is −1 m$^{-1}$;

FIGS. 6I, 6J, 6K, and 6L are diagrams showing aberration characteristics in the third embodiment where the diopter is −3 m$^{-1}$;

DETAILED DESCRIPTION OF THE PREFERRED EMBODIMENTS

Figure 1:
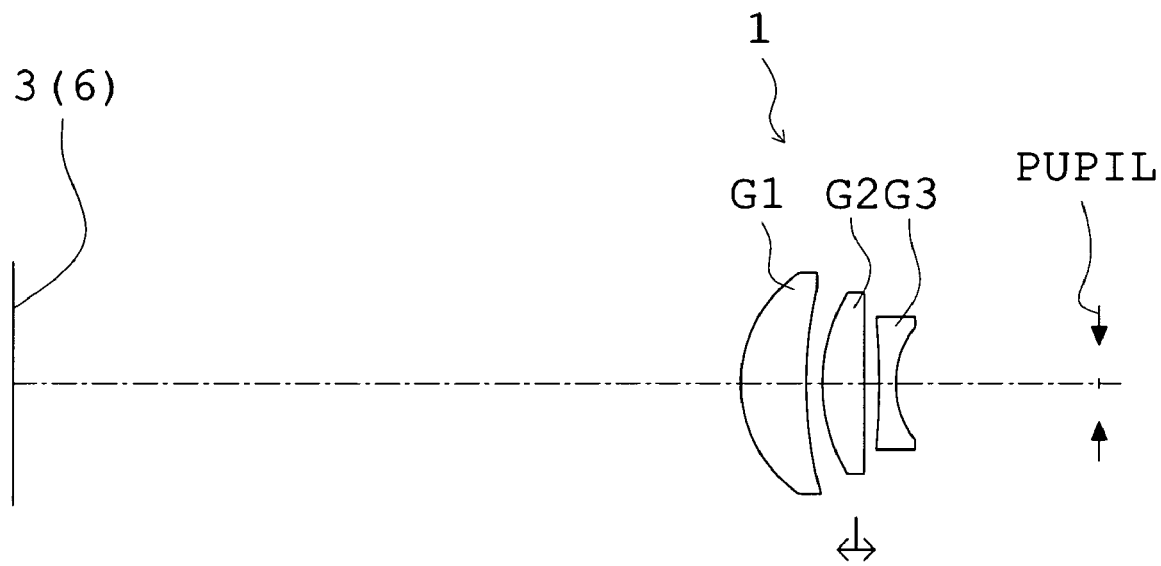
FIG. 1 is a sectional view showing an optical arrangement, developed along the optical axis, of a first embodiment in the present invention.

The eyepiece of a first aspect of the present invention comprises, in order from the object side, a first lens with positive power, a second lens with positive power, and a third lens with negative power. The first lens is a positive meniscus lens with a convex surface facing the object side, and the eyepiece fails to have a fourth lens.

The eyepiece of a second aspect of the present invention, in the eyepiece of the first aspect, satisfies the following conditions:

$$0.6<f1/f<1.2 \tag{1}$$

$$-2.0<f1-2/f3<-1.0 \tag{2}$$

$$-0.45<f3/f<-0.25 \tag{3}$$

where f1 is the focal length of the first lens; f1-2 is a combined focal length of the first and second lenses and is a focal length where a diopter is $-1$ m$^{-1}$ when the focal length of the eyepiece is changed; f3 is the focal length of the third lens; and f is the focal length of the entire system of the eyepiece and is a focal length where a diopter is $-1$ m$^{-1}$ when the focal length of the eyepiece is changed.

The eyepiece of a third aspect of the present invention, in the eyepiece of the first aspect, satisfies Condition (1).

The eyepiece of a fourth aspect of the present invention, in the eyepiece of the first aspect, satisfies Condition (2).

The eyepiece of a fifth aspect of the present invention, in the eyepiece of the first aspect, satisfies Condition (3).

The eyepiece of a sixth aspect of the present invention, in the eyepiece of the first aspect, satisfies the following condition:

$$-3.0<(r1+r2)/(r1-r2)<-1.01 \tag{4}$$

where r1 is the paraxial radius of curvature of the object-side refracting surface of the first lens and r2 is the paraxial radius of curvature of the pupil-side refracting surface of the first lens.

The eyepiece of a seventh aspect of the present invention comprises, in order from the object side, a first lens with positive power, a second lens with negative power, a third lens with positive power, and a fourth lens with negative power. The eyepiece fails to have a fifth lens.

The eyepiece of an eighth aspect of the present invention, in the eyepiece of the first aspect, is constructed so that at least two of the first lens, the second lens, and the third lens are made of plastic, and at least one refracting surface of the lenses made of plastic is aspherical.

The eyepiece of a ninth aspect of the present invention, in the eyepiece of the seventh aspect, is constructed so that at least two of the first lens, the second lens, the third lens, and the fourth lens are made of plastic, and at least one refracting surface of the lenses made of plastic is aspherical.

The eyepiece of a tenth aspect of the present invention, in the eyepiece of the first aspect, is constructed so that the second lens is moved along the optical axis to perform a diopter adjustment.

The eyepiece of an eleventh aspect of the present invention, in the eyepiece of the seventh aspect, satisfies the following conditions:

$$0.6<f1/f<1.3 \tag{5}$$

$$-2.0<f1-3/f4<-1.0 \tag{7}$$

$$-0.5<f4/f<-0.25 \tag{8}$$

where f1-3 is a combined focal length of the first, second, and third lenses and is a focal length where a diopter is $-1$ m$^{-1}$ when the focal length of the eyepiece is changed and f4 is the focal length of the fourth lens.

The eyepiece of a twelfth aspect of the present invention, in the eyepiece of the seventh aspect, satisfies the following condition and Conditions (7) and (8):

$$0.61<f1-2/f<1.4 \tag{6}$$

The eyepiece of a thirteenth aspect of the present invention, in the eyepiece of the seventh aspect, satisfies Condition (5).

The eyepiece of a fourteenth aspect of the present invention, in the eyepiece of the seventh aspect, satisfies Condition (7).

The eyepiece of a fifteenth aspect of the present invention, in the eyepiece of the seventh aspect, satisfies Condition (8).

The eyepiece of a sixteenth aspect of the present invention, in the eyepiece of the seventh aspect, satisfies Condition (6).

The eyepiece of a seventeenth aspect of the present invention, in the eyepiece of the seventh aspect, satisfies the following condition:

$$-2.0<(r1+r2)/(r1-r2)<-0.1 \tag{9}$$

The eyepiece of an eighteenth aspect of the present invention, in the eyepiece of the seventh aspect, is constructed so that the third lens is moved along the optical axis to make the diopter adjustment.

The finder optical system of a first aspect of the present invention comprises an image forming section forming an image of an object and the eyepiece of any one of the first to eighteenth aspects for observing the image. The eyepiece includes, in order from the object side toward the pupil side, a first lens with positive power, a second lens with positive power, and a third lens with negative power, and the first lens is a positive meniscus lens with a convex surface facing the object side. The eyepiece fails to have a fourth lens and satisfies the following condition:

$$2.5<fb/Y<4.0 \tag{10}$$

where fb is an equivalent-air medium length (mm) from the image plane of the object to the entrance surface of the first lens and Y is a diagonal length (mm) of the image plane of the object in the image forming section.

The finder optical system of a second aspect of the present invention comprises an image forming section forming an image of an object and the eyepiece of any one of the first to eighteenth aspects for observing the image. The eyepiece includes, in order from the object side toward the pupil side, a first lens with positive power, a second lens with negative power, a third lens with positive power, and a fourth lens with negative power. The eyepiece fails to have a fifth lens and satisfies Condition (10).

The finder optical system of a third aspect of the present invention comprises an image forming section forming an image of an object and the eyepiece of any one of the first to eighteenth aspects for observing the image. The eyepiece includes, in order from the object side toward the pupil side, a first lens with positive power, a second lens with positive power, and a third lens with negative power, and the first lens is a positive meniscus lens with a convex surface facing the object side. The eyepiece fails to have a fourth lens and satisfies the following condition:

20.0 mm<Y<26.0 mm    (11)

The finder optical system of a fourth aspect of the present invention comprises an image forming section forming an image of an object and the eyepiece of any one of the first to eighteenth aspects for observing the image. The eyepiece includes, in order from the object side toward the pupil side, a first lens with positive power, a second lens with negative power, a third lens with positive power, and a fourth lens with negative power. The eyepiece fails to have a fifth lens and satisfies Condition (11).

The finder optical system of a fifth aspect of the present invention comprises an objective lens forming a real image of an object and the eyepiece of any one of the first to eighteenth aspects for observing the real image. The eyepiece includes, in order from the object side toward the pupil side, a first lens with positive power, a second lens with positive power, and a third lens with negative power, and the first lens is a positive meniscus lens with a convex surface facing the object side. The eyepiece fails to have a fourth lens.

The finder optical system of a sixth aspect of the present invention comprises an objective lens forming a real image of an object and the eyepiece of any one of the first to eighteenth aspects for observing the real image. The eyepiece includes, in order from the object side toward the pupil side, a first lens with positive power, a second lens with negative power, a third lens with positive power, and a fourth lens with negative power. The eyepiece fails to have a fifth lens.

The finder optical system for a single-lens reflex camera of a seventh aspect of the present invention comprises a first reflecting surface reflecting a light beam emerging from a photographing optical system in a longitudinal direction of a camera body, an image forming section placed on the reflection side of the first reflecting surface in the proximity of a primary imaging plane formed by the photographing optical system, a plurality of reflecting surfaces arranged on the pupil side of the primary imaging plane, and an eyepiece. The first reflecting surface and the plurality of reflecting surfaces constitute a Porro-type image inverting optical system.

The digital single-lens reflex camera of a first aspect of the present invention comprises an image sensor converting an image of an object formed on its imaging surface into an electric signal and an observation optical system for observing an intermediate image of the object formed at a position nearly equivalent to the imaging surface. When a light ray incident perpendicularly on the center of the image sensor is thought of as an incident optical axis and a plane containing the incident optical axis on a reflecting surface and a bent optical axis is thought of as an optical axis incident plane, the observation optical system includes an image inverting optical system including a first reflecting surface, a second reflecting surface, a third reflecting surface, a fourth reflecting surface, and an eyepiece placed on the optical axis bent by the fourth reflecting surface. The first reflecting surface is placed on the incident optical axis of the image sensor to bend the incident optical axis in the horizontal direction of the camera, the second reflecting surface is placed on the optical axis bent by the first reflecting surface and in a direction in which the optical axis incident plane of the second reflecting surface intersects with that of the first reflecting surface, the third reflecting surface is placed on the optical axis bent by the second reflecting surface so that the optical axis bent by the second reflecting surface is bent in a direction opposite to the traveling direction of an incident ray on the second reflecting surface and nearly parallel to the optical axis bent by the first reflecting surface, and the fourth reflecting surface is placed on the optical axis bent by the third reflecting surface so that the optical axis bent by the third reflecting surface is bent in the same direction as the traveling direction of the incident ray on the first reflecting surface and nearly parallel to the incident optical axis on the first reflecting surface. The digital single-lens reflex camera comprises a path-splitting surface placed on the optical path from the first reflecting surface to the fourth reflecting surface in the image inverting optical system, and an imaging optical system and a light-receiving element or a light-emitting element, placed on one of optical paths split by the path-splitting surface.

The digital single-lens reflex camera of a second aspect of the present invention, in the digital single-lens reflex camera of the first aspect, is constructed so that the path-splitting surface is one of the second reflecting surface, the third reflecting surface, and the fourth reflecting surface, and the imaging optical system and the light-receiving element or the light-emitting element is placed on the optical axis located on the transmission side of the path-splitting surface.

The digital single-lens reflex camera of a third aspect of the present invention, in the digital single-lens reflex camera of the first aspect, is constructed so that the imaging surface has a rectangular shape extending in a horizontal direction and the optical axis bent by the first reflecting surface is parallel to the major side of the imaging surface.

The digital single-lens reflex camera of a fourth aspect of the present invention, in the digital single-lens reflex camera of the first aspect, is constructed so that the intermediate image is formed between the first reflecting surface and the second reflecting surface and satisfies the following conditions:

18.0 mm<Y<26.0 mm    (12)

1.0<H/V<1.4    (13)

where Y is the diagonal length of an intermediate image plane, H is the length of the major side of the intermediate image plane, and V is the length of the minor side of the intermediate image plane.

The digital single-lens reflex camera of a fifth aspect of the present invention, in the digital single-lens reflex camera of the first aspect, has a screen surface between the first reflecting surface and the second reflecting surface.

The digital single-lens reflex camera of a sixth aspect of the present invention, in the digital single-lens reflex camera of the first aspect, is constructed so that the first reflecting surface is a quick-return mirror that is rotated about its minor side as an axis to retire in the direction of the major side of the imaging surface.

The digital single-lens reflex camera of a seventh aspect of the present invention, in the digital single-lens reflex camera of the first aspect, is constructed so that the path-splitting surface is the second reflecting surface, the intermediate image is formed between the first reflecting surface and the second reflecting surface, positive refracting power is provided between the first reflecting surface and the second reflecting surface, and negative refracting power is provided between the second reflecting surface and the third reflecting surface.

The digital single-lens reflex camera of an eighth aspect of the present invention, in the digital single-lens reflex camera of the seventh aspect, satisfies the following conditions:

$$0.5 < fF/fe < 1.4 \quad (14)$$

$$-3.3 < fN/Y < -2.3 \quad (15)$$

where fF is the focal length of an optical system constructed with optical members interposed between the first reflecting surface and the second reflecting surface, fe is the focal length of an optical system constructed with optical members located behind the intermediate image of the observation optical system, and fN is the focal length of an optical system constructed with optical members interposed between the second reflecting surface and the third reflecting surface. Also, each factor of the conditions is assumed to be a value such that when the diopter of the observation optical system is continuously changed in association with the movement of the optical members constituting the digital single-lens reflex camera, it becomes −1.0 diopter.

The digital single-lens reflex camera of a ninth aspect of the present invention, in the digital single-lens reflex camera of the seventh aspect, further comprises a field lens with positive refracting power interposed between the first reflecting surface and the second reflecting surface, and a negative lens interposed between the second reflecting surface and the third reflecting surface.

The digital single-lens reflex camera of a tenth aspect of the present invention, in the digital single-lens reflex camera of the ninth aspect, is constructed so that the field lens includes a Fresnel surface with positive refracting power and a screen surface.

The digital single-lens reflex camera of an eleventh aspect of the present invention, in the digital single-lens reflex camera of the first aspect, is constructed so that the path-splitting surface is the second reflecting surface, the intermediate image is formed between the first reflecting surface and the second reflecting surface, positive refracting power is provided between the first reflecting surface and the second reflecting surface, negative refracting power is provided between the second reflecting surface and the third reflecting surface, and positive refracting power is provided between the second reflecting surface and the imaging optical system.

The digital single-lens reflex camera of a twelfth aspect of the present invention, in the digital single-lens reflex camera of the first aspect, is constructed so that the path-splitting surface is the second reflecting surface, the intermediate image is formed between the first reflecting surface and the second reflecting surface, positive refracting power is provided between the first reflecting surface and the second reflecting surface, refracting power is zero between the second reflecting surface and the third reflecting surface, and positive refracting power is provided between the second reflecting surface and the imaging optical system.

The digital single-lens reflex camera of a thirteenth aspect of the present invention, in the digital single-lens reflex camera of the eleventh or twelfth aspect, includes a positive lens interposed between the second reflecting surface and the imaging optical system.

The digital single-lens reflex camera of a fourteenth aspect of the present invention, in the digital single-lens reflex camera of the first aspect, has the imaging optical system and the light-receiving element on the optical axis located on the transmission side of the path-splitting surface so that the light-receiving element is constructed as a second image sensor converting the image of the object into an electric signal.

The digital single-lens reflex camera includes a display element, placed on the backside of the camera, for converting the electric signal of the image of the object formed by the second image sensor to display the image.

The digital single-lens reflex camera of a fifteenth aspect of the present invention, in the digital single-lens reflex camera of the first aspect, is constructed so that the imaging optical system includes a reflecting prism.

The digital single-lens reflex camera of a sixteenth aspect of the present invention, in the digital single-lens reflex camera of the first aspect, is constructed so that the imaging optical system includes a plurality of reflecting prisms.

The digital single-lens reflex camera of a seventeenth aspect of the present invention, in the digital single-lens reflex camera of the first aspect, is constructed so that the imaging optical system includes a plurality of reflecting prisms having lens functions.

The digital single-lens reflex camera of an eighteenth aspect of the present invention, in the digital single-lens reflex camera of the first aspect, is constructed so that the path-splitting surface is the second reflecting surface, the intermediate image is formed between the first reflecting surface and the second reflecting surface, positive refracting power is provided between the first reflecting surface and the second reflecting surface, refracting power is zero between the second reflecting surface and the third reflecting surface, and the imaging optical system is placed on the transmission side of the second reflecting surface and includes a single lens without having a plurality of lenses.

The digital single-lens reflex camera of a nineteenth aspect of the present invention comprises an image sensor converting an image of an object formed on its imaging surface into an electric signal and an observation optical system for observing an intermediate image of the object formed at a position nearly equivalent to the imaging surface. When a light ray incident perpendicularly on the center of the image sensor is thought of as an incident optical axis and a plane containing the incident optical axis on a reflecting surface and a bent optical axis is thought of as an optical axis incident plane, the observation optical system includes an image inverting optical system including a first reflecting surface, a second reflecting surface, a third reflecting surface, a fourth reflecting surface. The first reflecting surface is placed on the incident optical axis of the image sensor to bend the incident optical axis in the horizontal direction of the camera, the second reflecting surface is placed on the optical axis bent by the first reflecting surface and in a direction in which the optical axis incident plane of the second reflecting surface intersects with that of the first reflecting surface, the third reflecting surface is placed on the optical axis bent by the second reflecting surface so that the optical axis bent by the second reflecting surface is bent in a direction opposite to the traveling direction of an incident ray on the second reflecting surface and nearly parallel to the optical axis bent by the first reflecting surface, and the fourth reflecting surface is placed on the optical axis bent by the third reflecting surface so that the optical axis bent by the third reflecting surface is bent in the same direction as the traveling direction of the incident ray on the first reflecting surface and nearly parallel to the incident optical axis on the first reflecting surface. The imaging surface has a rectangular shape extending in a horizontal direction and the optical axis bent by the first reflecting surface is nearly parallel to the major side of the imaging surface.

The digital single-lens reflex camera of a twentieth aspect of the present invention, in the digital single-lens reflex camera of the nineteenth aspect, is constructed so that the intermediate image is formed between the first reflecting surface and the second reflecting surface and satisfies Conditions (12) and (13).

The digital single-lens reflex camera of a twenty-first aspect of the present invention, in the digital single-lens reflex camera of the nineteenth aspect, is constructed so that the first reflecting surface is a quick-return mirror that is rotated about the minor side as an axis to retire in the direction of the major side of the imaging surface.

The digital single-lens reflex camera of a twenty-second aspect of the present invention comprises an image sensor converting an image of an object formed on its imaging surface into an electric signal and an observation optical system for observing an intermediate image of the object formed at a position nearly equivalent to the imaging surface. When a light ray incident perpendicularly on the center of the image sensor is thought of as an incident optical axis and a plane containing the incident optical axis on a reflecting surface and a bent optical axis is thought of as an optical axis incident plane, the observation optical system includes an image inverting optical system including a first reflecting surface, a second reflecting surface, a third reflecting surface, a fourth reflecting surface. The first reflecting surface is placed on the incident optical axis of the image sensor to bend the incident optical axis in the horizontal direction of the camera, the second reflecting surface is placed on the optical axis bent by the first reflecting surface and in a direction in which the optical axis incident plane of the second reflecting surface intersects with that of the first reflecting surface, the third reflecting surface is placed on the optical axis bent by the second reflecting surface so that the optical axis bent by the second reflecting surface is bent in a direction opposite to the traveling direction of an incident ray on the second reflecting surface and nearly parallel to the optical axis bent by the first reflecting surface, and the fourth reflecting surface is placed on the optical axis bent by the third reflecting surface so that the optical axis bent by the third reflecting surface is bent in the same direction as the traveling direction of the incident ray on the first reflecting surface and nearly parallel to the incident optical axis on the first reflecting surface. The path-splitting surface is the second reflecting surface, the intermediate image is formed between the first reflecting surface and the second reflecting surface, positive refracting power is provided between the first reflecting surface and the second reflecting surface, and negative refracting power is provided between the second reflecting surface and the third reflecting surface.

The digital single-lens reflex camera of a twenty-third aspect of the present invention, in the digital single-lens reflex camera of the twenty-second aspect, satisfies Conditions (14) and (15).

The digital single-lens reflex camera of a twenty-fourth aspect of the present invention, in the digital single-lens reflex camera of the twenty-second aspect, comprises a field lens with positive refracting power interposed between the first reflecting surface and the second reflecting surface and a negative lens interposed between the second reflecting surface and the third reflecting surface.

The digital single-lens reflex camera of a twenty-fifth aspect of the present invention, in the digital single-lens reflex camera of the twenty-fourth aspect, is constructed so that the field lens has a Fresnel lens surface with positive refracting power and a screen surface.

Also, the digital single-lens reflex camera of the present invention may be designed to satisfy a plurality of aspects of the constructions mentioned above.

Before undertaking the description of the embodiments, the function of effect of the present invention will be explained.

The eyepiece of the first aspect of the present invention is constructed with a power distribution of the first lens that is the positive meniscus lens with a convex surface facing the object side, the second lens with positive power, and the third lens with negative power, arranged in this order from the object side, in order to increase the back focus.

Since the eyepiece is placed to have, in order from the object side, positive, positive, and negative powers, the principal point of the eyepiece can be shifted toward the object. The optical system provided with two positive lenses is constructed and thus the production of aberration is easily suppressed. Moreover, the first lens is constructed as the meniscus lens with a convex surface facing the object side, and thereby it becomes easy to shift the principal point to the object side. This is advantageous for ensuring the back focus.

The eyepiece of each of the second to fifth aspects of the present invention satisfies one or at least two of Conditions (1) to (3). What follows is a description of significations of Conditions (1) to (3).

In order to impart proper power to the first lens, it is desirable that the first lens satisfies Condition (1). If the value of Condition (1) is below the lower limit and the positive power of the lens is strengthened, complete correction for aberration will become difficult. On the other hand, if the value of Condition (1) is beyond the upper limit and the positive power of the lens is weakened, a ray height on the front side (the object side) of the first lens will be increased. Thus, when a prism is placed as a member interposed between a surface to be observed and the eyepiece, eclipse is liable to be produced by the member. Consequently, it becomes difficult to increase the eyepoint distance.

The lower limit of Condition (1) may be preferably set to 0.65 or 0.70. The upper limit of Condition (1) may be set to 1.0 or 0.9.

In the eyepiece of each of the second and fourth aspects of the present invention, the focal length of the entire system of the eyepiece is reduced and at the same time, the negative power is imparted to the third lens. Whereby, the front principal point is shifted to the front side (the object side) of the eyepiece. Consequently, the combined power of the first lens and the second lens is inevitably increased. At the same time, it is favorable to balance the power between a positive component and a negative component.

Thus, it is desirable that the combined focal length of the first lens and the second lens satisfies Condition (2).

Beyond the upper limit of Condition (2), it becomes difficult to correct axial chromatic aberration. Below the lower limit of Condition (2), it becomes hard to correct curvature of field.

The lower limit of Condition (2) may be preferably set to $-1.7$ or $-1.5$. The upper limit of Condition (2) may be set to $-1.05$ or $-1.1$.

In the eyepiece of each of the second and fifth aspects of the present invention, the negative power is imparted to the third lens unit and the front principal point is shifted to the front side (the object side) of the eyepiece. Whereby, a long back focus is ensured without increasing the focal length. In this case, it is desirable to satisfy Condition (3).

If the value of Condition (3) is below the lower limit and the negative power of the lens is weakened, the effect of shifting the front principal point to the front side (the object side) will be lessened and it will become difficult to ensure a complete back focus. On the other hand, if the value of Condition (3) is beyond the upper limit and the negative power of the lens is strengthened, complete correction for aberration will become difficult in the present invention.

The lower limit of Condition (3) may be preferably set to −0.42 or −0.40. The upper limit of Condition (3) may be set to −0.26.

In the eyepiece of the eighth aspect of the present invention, it is desirable that at least two of the lenses contained in the eyepiece are constructed of plastic. Whereby, the cost of the optical system can be materially reduced, as compared with the case where glass lenses are used.

It is further desirable that at least one surface of the lenses constructed of plastic is aspherical. It is effective that the object-side surface of the second lens is preferably configured as an aspherical surface. By doing so, distortion can be favorably corrected.

It is particularly desirable that the object-side surface of the second lens has a positive power stronger than the pupil-side surface in order to increase the back focus.

It is favorable for correction of aberration that the aspherical surface for the object-side surface of the second lens is configured so that the positive power weakens progressively in going from the center to the periphery.

In the eyepiece of each of the first to sixth aspects of the present invention, the first lens is configured as a positive meniscus lens with a convex surface facing the object side.

In the eyepiece of the sixth aspect of the present invention, it is desirable that the configuration of the positive meniscus lens satisfies Condition (4).

Below the lower limit of Condition (4), the power of the object-side surface of the first lens is increased in order to ensure the refracting power of the first lens and it becomes difficult to correct aberration. Beyond the upper limit of Condition (4), it becomes hard to obtain a long back focus.

The lower limit of Condition (4) may be preferably set to −2.5 or −2.2. The upper limit of Condition (4) may be set to −1.03 or −1.5.

For Conditions (1) to (4), the eyepiece may be designed to satisfy a plurality of conditions simultaneously, and the upper limits or the lower limits of Conditions (1) to (4) may be set as corresponding values in the embodiments described in the present invention.

In the eyepiece of the ninth aspect of the present invention, it is desirable that the second lens is moved along the optical axis to make the diopter adjustment. By moving the second lens, the object-side and pupil-side lenses can be fixed, and thus penetration of dust into the eyepiece can be minimized.

Since the first lens that has a tendency to increase in diameter can be fixed, a driving mechanism for diopter adjustment can be made small. Moreover, since the first lens is fixed, space provided around the first lens can be utilized for placing other members.

The eyepiece of the seventh aspect of the present invention is constructed with the power distribution of the first lens with positive power, the second lens with negative power, the third lens with positive power, and the fourth lens with negative power, arranged in this order from the object side, in order to increase the back focus.

The eyepiece constructed as mentioned above has two negative lenses, and hence it becomes easier to ensure the back focus.

Since the powers of individual lenses can be weakened, aberrations can be favorably corrected.

Furthermore, at least one surface of the lenses is configured as the aspherical surface, and thereby distortion can be favorably corrected. In particular, the third lens is provided with the aspherical surface, and this is further advantageous for correction of coma.

In the eyepiece of each of the eleventh to sixteenth aspects of the present invention, it is favorable to satisfy one or at least two of Conditions (5) to (8). What follows is a description of significations of Conditions (5) to (8).

In order to impart proper power to the first lens, it is desirable that the first lens satisfies Condition (5). If the value of Condition (5) is below the lower limit and the positive power of the lens is strengthened, complete correction for aberration will become difficult. On the other hand, if the value of Condition (5) is beyond the upper limit and the positive power of the lens is weakened, a ray height on the front side (the object side) of the first lens will be increased. Thus, when a member, such as a prism, is interposed between a surface to be observed and the eyepiece, eclipse is produced by the member. Consequently, it becomes difficult to increase the eyepoint distance.

The lower limit of Condition (5) may be preferably set to 0.7 or 0.8. The upper limit of Condition (5) may be set to 1.25.

The first lens is constructed as the positive lens with a convex surface, which has stronger curvature than in the pupil-side surface, facing the object side, and thereby the principal point is easily shifted to the object side so as to be advantageous for ensuring the back focus.

In particular, in the eyepiece of the seventh aspect of the present invention, even when the first lens is configured as a biconvex lens, the second lens is the negative lens and thus it is possible to increase the back focus while suppressing aberration.

Instead of satisfying Condition (5) or together with this condition, the first lens may be designed to satisfy Condition (6).

If the value of Condition (6) is below the lower limit and the combined power of the first lens and the second lens is strengthened, complete correction for aberration will become difficult. On the other hand, if the value of Condition (6) is beyond the upper limit and the combined power of the first lens and the second lens is weakened, a ray height on the front side of the first lens will be increased. Thus, when a member, such as a prism, is interposed between a surface to be observed and the eyepiece, eclipse is produced by the member. Consequently, it becomes difficult to increase the eyepoint distance.

The lower limit of Condition (6) may be preferably set to 0.8 or 1.0. The upper limit of Condition (6) may be set to 1.25.

In the eyepiece of each of the eleventh, twelfth, and fourteenth aspects of the present invention, the focal length of the entire finder optical system is reduced and at the same time, the negative power of the fourth lens is strengthened to shift the front principal point to the object side (the front side) of the eyepiece. Consequently, the combined power of the first lens to the third lens is inevitably increased. At the same time, it is necessary to balance the power between the positive component and the negative component.

It is thus desirable that the combined focal length of the first to third lenses satisfies Condition (7).

Beyond the upper limit of Condition (7), it becomes difficult to correct axial chromatic aberration. Below the lower limit of Condition (7), it becomes hard to correct curvature of field.

The lower limit of Condition (7) may be preferably set to −1.5 or −1.2. The upper limit of Condition (7) may be set to −1.05 or −1.08.

In the eyepiece of each of the eleventh, twelfth, and sixteenth aspects of the present invention, the negative power is imparted to the fourth lens to shift the front principal point to the front side (the object side) of the eyepiece. Whereby, a long back focus can be ensured without increasing the focal length. In this case, it is desirable to satisfy Condition (8).

If the value of Condition (8) is below the lower limit and the negative power of the lens is weakened, the effect of shifting the front principal point to the front side (the object side) will be impaired and a complete back focus can no longer be ensured. On the other hand, if the value of Condition (8) is beyond the upper limit and the negative power of the lens is strengthened, complete correction for aberration will become difficult in the present invention.

The lower limit of Condition (8) may be preferably set to −0.48 or −0.35. The upper limit of Condition (8) may be set to −0.35 or −0.4.

In the eyepiece of the sixteenth aspect of the present invention, the first lens is configured as the positive lens. It is favorable that the configuration of this positive lens satisfies Condition (9).

Condition (9) is set on the premise that the negative lens is placed as the second lens. In the eyepiece constructed so that the negative lens is placed as the second lens, there is no need to configure the first lens into a strong meniscus shape and an advantageous shape for correction of aberration can be assumed.

Below the lower limit of Condition (9), a meniscus-shaped lens whose object-side surface has strong power is obtained in order to ensure the refracting power of the first lens, and it becomes hard to correct aberration. Beyond the upper limit of Condition (9), it becomes hard to attain a long back focus.

The lower limit of Condition (9) may be preferably set to −1.5 or −0.95. The upper limit of Condition (9) may be set to −0.5 or −0.8.

For Conditions (5) to (9), the eyepiece may be designed to satisfy a plurality of conditions simultaneously, and the upper limits or the lower limits of Conditions (5) to (9) may be set as corresponding values in the embodiments described in the present invention.

In the eyepiece of the eighteenth aspect of the present invention, it is desirable that the third lens is moved along the optical axis to make the diopter adjustment. By moving the third lens, the object-side and pupil-side lenses can be fixed, and thus penetration of dust into the eyepiece can be minimized.

Since the first lens and the second lens, each having a tendency to increase in diameter, are fixed, a driving mechanism for diopter adjustment can be made small.

In the finder optical system of the first aspect of the present invention, it is favorable that the distance from the image plane of the object to the entrance surface of the first lens of the eyepiece satisfies Condition (10).

In general, optical members for erect images, such as pentagonal roof prisms, pentagonal roof mirrors, Porro prisms, or Porro mirrors, are arranged in a space from the image plane of the object to the entrance surface of the first lens of the eyepiece, and hence sufficient space in which these members can be provided without any problem becomes necessary.

Below the lower limit of Condition (10), the back focus becomes insufficient and an image erecting system ceases to be constructed. On the other hand, cases not unfrequently occur in which it becomes necessary to incorporate various display devices or photometric devices in a space around the finder, and it is desirable that the longest possible back focus can be ensured.

Beyond the upper limit of Condition (10), however, the back focus is increased and complete correction for aberration becomes difficult in the present invention.

The lower limit of Condition (10) may be preferably set to 2.7 or 2.9. The upper limit of Condition (10) may be set to 3.9 or 3.8.

Also, in the image forming section, it is good practice to include an objective lens forming the real image of the object and a field frame member, a screen mat used in the single-lens reflex camera, or a liquid crystal display element.

The finder optical system of the third aspect of the present invention is suitable for a camera whose frame size is about a half of a 35 mm silver-halide film. Specifically, it is favorable to satisfy Condition (11).

If the value of Condition (11) is below the lower limit and the frame size is reduced, the finder magnification must be significantly increased and correction for aberration becomes difficult in the present invention. If the value of Condition (11) is beyond the upper limit and the frame size is increased, the size of the entire finder will also be increased.

The lower limit of Condition (11) may be preferably set to 21.0 or 21.5. The upper limit of Condition (11) may be set to 24.0 or 23.0.

The finder optical system of the fifth aspect of the present invention is designed to include the eyepiece and the objective lens forming the real image of the object and to observe the real image through the eyepiece.

Thus, the image to be observed, which is an optical image, is more easily observed than an electronic image due to an electronic display element having pixels. Moreover, the finder optical system can be designed to afford low cost and power saving.

The finder optical system of the seventh aspect of the present invention comprises the first reflecting surface reflecting the light beam emerging from the photographing optical system in the longitudinal direction of the camera body, the image forming section placed on the reflection side of the first reflecting surface in the proximity of the primary imaging plane formed by the photographing optical system, and a plurality of reflecting surfaces and the eyepiece, arranged on the pupil side of the primary imaging plane. The first reflecting surface and the plurality of reflecting surfaces constitute a Porro-type image inverting optical system.

By this arrangement, the light beam is reflected in the longitudinal direction of the camera body by the main mirror, which is the first reflecting surface, located on the front side (the object side) of the primary imaging plane. The image formed by the photographing optical system is erected by four reflecting surfaces, including the first reflecting surface, so that it can be observed through the eyepiece.

When image inverting optical members are constructed as mentioned above, the projection of a roof portion is absent, in contrast with a finder optical system where pentagonal roof prisms are used, and thus a camera body that is compact in height and slim can be obtained.

Furthermore, the compact design of the entire camera is attained, and in spite of the fact that the single-lens reflex camera is used, a camera of size similar to a compact camera can be realized.

In the digital single-lens reflex camera applied to the present invention, a photographic lens constructed to be integral with the digital single-lens reflex camera or removable is mounted to the digital single-lens reflex camera, and thereby the image formed on the imaging surface of the image sensor by light rays passing through the photographic lens is converted into the electric signal for processing (for example, image processing or store).

Here, as in the digital single-lens reflex camera of the first aspect of the present invention, when the camera is constructed so that a light ray incident from the photographic lens is reflected by the first reflecting surface, the second reflecting surface, the third reflecting surface, and the fourth reflecting surface in the observation optical system, the intermediate image of the object can be observed as an erect image in the same manner that the image of the object can be observed as an erect image through the optical path of the so-called Porro prism or Porro mirror.

Here, as in the digital single-lens reflex camera of the first aspect of the present invention, when an arrangement is made such that an observation optical path formed by the first, second, third and fourth reflecting surfaces is bent in a plane nearly perpendicular to an incident optical axis, an optical layout that has little influence on the thickness of the camera can be attained.

As in the digital single-lens reflex camera of the first aspect of the present invention, when the position of the fourth reflecting surface located on the reflection optical axis of the third reflecting surface is shifted so that the position of the reflection optical axis bent by the fourth reflecting surface to enter the eyepiece is shifted, the position of an exit window of the finder can be changed, and an optical layout situated at a position where it is easy to use the optical system can be attained. In such an optical layout, sufficient space for providing the path-splitting surface, the imaging optical system, and the light-receiving element or a light-emitting element is easily ensured.

For example, in the digital single-lens reflex camera of the first aspect of the present invention, when the image sensor, such as a CCD or C-MOS, is used as the light-receiving element, image information from the image sensor can be transmitted to a display element, such as a liquid crystal display (LCD), and an electronic viewfinder electronically displaying the information can be provided.

In the digital single-lens reflex camera of the first aspect of the present invention, the imaging optical system and the light-receiving element may be designed to detect the brightness and focusing state of the object. They may also be such as to receive light from a viewer's eye and to detect the line of sight of the viewer.

In the digital single-lens reflex camera of the first aspect of the present invention, when the light-emitting element, instead of the light-receiving element, is used, it can be constructed so that light is projected at a focusing position to inform the position of a focused object.

As in the digital single-lens reflex camera of the second aspect of the present invention, when one of the second, third, and fourth reflecting surfaces is used as the path-splitting surface, the optical system, such as the imaging optical system, can be placed on the optical path formed on the rear side of the path-splitting surface, and space provided on the rear side of the path-splitting surface can be effectively utilized. An arrangement is made such that an observation optical path formed by the first, second, third and fourth reflecting surfaces is bent in a plane nearly perpendicular to an incident optical axis, and the optical path formed on the rear side of the path-splitting surface is also in the plane nearly perpendicular to the incident optical axis. Thus, even when the optical system, such as the imaging optical system, is placed, the influence of thickness of the camera can be lessened.

As in the digital single-lens reflex camera of the third aspect of the present invention, when the imaging surface has a rectangular shape extending in a horizontal direction and the optical axis bent by the first reflecting surface is parallel to the major side of the imaging surface, an increase in height of the camera can be suppressed.

The camera body has a general structure that is long in lateral direction. Therefore, as in the digital single-lens reflex camera of the third aspect of the present invention, when the optical axis bent by the first reflecting surface is parallel to the major side of the imaging surface, the optical system, such as the imaging optical system, is placed in the lateral direction of the camera when the second reflecting surface is used as the path-splitting surface. This is advantageous for ensuring the space.

In the digital single-lens reflex camera of the first aspect of the present invention, a distance between the first reflecting surface and the intermediate image plane is about equal to a distance between the first reflecting surface and the image sensor. As such, when the distance between the first reflecting surface and the intermediate image plane is reduced, the distance between the first reflecting surface and the image sensor can also be relatively reduced.

Hence, as in the digital single-lens reflex camera of the fourth aspect of the present invention, when the intermediate image plane is formed between the first reflecting surface and the second reflecting surface, the distance between the first reflecting surface and the image sensor, in contrast with the case where the intermediate image plane is located behind the second reflecting surface, can be reduced. This is advantageous for decreasing the thickness of the camera.

As in the digital single-lens reflex camera of the fourth aspect of the present invention, the major side of the intermediate image plane formed between the first reflecting surface and the second reflecting surface corresponds to that of the imaging surface and also corresponds to the thickness of the camera. Thus, when the length of the major side of the intermediate image plane is moderated, the thickness of the camera can be decreased.

As in the digital single-lens reflex camera of the first aspect of the present invention, it is favorable that the intermediate image plane satisfies Conditions (12) and (13), because when the size of the intermediate image plane is too small, it becomes hard to enlarge an observation field.

Condition (12) determines the diagonal length Y of the intermediate image plane and prescribes a smaller area than the size of the intermediate image used in a conventional digital single-lens reflex camera.

If the diagonal length Y of the intermediate image plane is below the lower limit of Condition (12), the observation field will be narrowed. Beyond the upper limit of Condition (12), the result is unfavorable for the compact design of the camera.

Also, in the digital single-lens reflex camera of the present invention, it is desirable that the lower limit of Condition (12) is set to 19.0. It is more desirable that the lower limit is set to 20.0. In the digital single-lens reflex camera of the present invention, it is desirable that the upper limit of Condition (12) is set to 24.0. It is more desirable that the upper limit is set to 22.0.

Condition (13) defines the ratio of the length H of the major side of the intermediate image plane to the length V of the minor side of the intermediate image plane.

If the value of the ratio H/V is below the lower limit of Condition (13), a photograph at a normal position becomes square or long in a vertical direction, which is unfavorable. Beyond the upper limit of Condition (13), a difference between the minor side and the major side becomes considerable, and thus the visual field in the direction of the minor side becomes narrower than that in the direction of the major side so that it is difficult to make observations.

Also, in the digital single-lens reflex camera of the present invention, it is desirable that the lower limit of Condition (13) is set to 1.25. It is more desirable that the lower limit is set to 1.30. In the digital single-lens reflex camera of the present invention, it is desirable that the upper limit of Condition (13) is set to 1.35.

When the value of the ratio H/V is within the limit of Condition (13), the influence of thickness of the camera is not very significant even though the camera is constructed so that the first reflecting surface is rotated about either the major side or the minor side of the first reflecting surface as an axis to retire from the incident optical axis.

Even when the first reflecting surface is designed to bend the incident optical axis in parallel to the major side of the imaging surface, space for retiring the first reflecting surface from the incident optical axis, with the minor side of the first reflecting surface as an axis, can be held in the direction of the thickness of the camera.

As in the digital single-lens reflex camera of the fifth aspect of the present invention, when the screen surface (for example, ground glass or a minute-prism array) is located at the position of the intermediate image formed between the first reflecting surface and the second reflecting surface, the position of the image formed by the photographic lens is equal to that of the intermediate image formed between the first reflecting surface and the second reflecting surface. As such, by recognizing the object image on the screen surface, the focus adjustment of the object image can be facilitated.

As in the digital single-lens reflex camera of the sixth aspect of the present invention, when the incident optical axis is bent parallel to the major side of the imaging surface by the quick-return mirror, the quick-return mirror is constructed so that it is rotated about the minor side as an axis in the direction of the major side of the imaging surface.

As in the digital single-lens reflex camera of the seventh aspect of the present invention, when the intermediate image is formed between the first reflecting surface and the second reflecting surface, and the positive refracting power is provided between the first reflecting surface and the second reflecting surface, an off-axis beam of light of the image plane is inclined toward the optical axis side and succeeding optical systems can be easily downsized.

Further, as in the digital single-lens reflex camera of the seventh aspect of the present invention, when the positive refracting power is strengthened between the first reflecting surface and the second reflecting surface, the distance from the intermediate image plane to the imaging optical system can be reduced. Even when space on the rear side of the second reflecting surface is narrow, the imaging optical system can be placed.

Still further, as in the digital single-lens reflex camera of the seventh aspect of the present invention, when the positive refracting power is strengthened between the first reflecting surface and the second reflecting surface, the light beam of the entire object image can be securely conducted to the proximity of the surface of the light-receiving element. As a result, when the digital single-lens reflex camera is provided with the through image function, the field area of the entire object image can be ensured in the imaging optical system and the light-receiving element.

Further, as in the digital single-lens reflex camera of the seventh aspect of the present invention, when the negative refracting power is provided between the second reflecting surface and the third reflecting surface, the convergence of the off-axis beam can be lessened, or the off-axis beam can be diverged. Consequently, even though the positive refracting power is extremely strengthened between the first reflecting surface and the second reflecting surface, space in which the reflecting surface for image inversion is placed and the eyepoint can be ensured.

As in the digital single-lens reflex camera of the eighth aspect of the present invention, it is desirable to satisfy Conditions (14) and (15).

Condition (14) determines the ratio of the focal length fF of the optical system constructed with optical members interposed between the first reflecting surface and the second reflecting surface to the focal length fe of the optical system constructed with optical members located behind the intermediate image of the observation optical system.

If the value of the ratio fF/fe is below the lower limit of Condition (14), the positive refracting power of the field lens will be extremely strengthened and it becomes difficult to ensure the eyepoint of the observation optical system.

If the value of the ratio fF/fe is beyond the upper limit of Condition (14), the positive refracting power of the field lens will be extremely weakened. Thus, the imaging optical system is liable to be oversized and the layout becomes difficult.

Also, in the digital single-lens reflex camera of the present invention, it is desirable that the lower limit of Condition (14) is set to 0.6. It is more desirable that the lower limit is set to 0.7. In the digital single-lens reflex camera of the present invention, it is desirable that the upper limit of Condition (14) is set to 1.0. It is more desirable that the upper limit is set to 0.8.

Condition (15) defines the ratio of the focal length fN of the optical system constructed with optical members interposed between the second reflecting surface and the third reflecting surface to the diagonal length Y of the intermediate image plane.

If the value of the ratio fN/Y is below the lower limit of Condition (15), the negative refracting power will be weakened, and thus it becomes difficult to ensure the optical path length of the observation optical system so that the placement of the reflecting surface is restricted.

If the value of the ratio fN/Y is beyond the upper limit of Condition (15), the negative refracting power will be strengthened, and thus the focal length of the eyepiece system is reduced so that it becomes difficult to ensure the magnification of the finder.

Also, in the digital single-lens reflex camera of the present invention, it is desirable that the lower limit of Condition (15) is set to −3.1. It is more desirable that the lower limit is set to −2.9. In the digital single-lens reflex camera of the present invention, it is desirable that the upper limit of Condition (15) is set to −2.5. It is more desirable that the upper limit is set to −2.7.

As in the digital single-lens reflex camera of the ninth aspect of the present invention, when the field lens with positive refracting power is interposed between the first reflecting surface and the second reflecting surface, and the negative lens is interposed between the second reflecting surface and the third reflecting surface, the refracting power required between individual reflecting surfaces can be ensured.

As in the digital single-lens reflex camera of the tenth aspect of the present invention, when the field lens has the Fresnel surface with positive refracting power and the screen surface, the number of elements can be reduced.

As in the digital single-lens reflex camera of the eleventh aspect of the present invention, when the positive refracting power is provided between the second reflecting surface and the imaging optical system, the positive refracting power provided between the first reflecting surface and the second reflecting surface can be weakened, and the negative refracting power relatively placed to weaken the positive refracting power, between the second reflecting surface and the third reflecting surface, can also be weakened.

Further, as in the digital single-lens reflex camera of the eleventh aspect of the present invention, when the positive refracting power is provided between the second reflecting surface and the imaging optical system, the number of degrees of design freedom of lenses constituting the observation optical system is increased, and aberration produced between the second reflecting surface and the third reflecting surface can be minimized. In addition, the observation of the observation optical system can be rendered favorable.

Still further, as in the digital single-lens reflex camera of the eleventh aspect of the present invention, when the positive refracting power is provided between the first reflecting surface and the second reflecting surface and between the second reflecting surface and the imaging optical system, a part of a role as the field lens with positive refracting power can be assumed between the second reflecting surface and the imaging optical system, and hence the refracting power can be shared.

When the positive refracting power is provided in the proximity of the backside of the second reflecting surface located close to the intermediate image plane, the function of the field lens can be optimized and optical performance can be rendered favorable.

In the case where the digital single-lens reflex camera is provided with the through image function, when the camera is constructed so that positive strong power is provided between the second reflecting power and the imaging optical system, the light beam of the entire object image can be securely conducted to the proximity of the surface of the light-receiving element through the imaging optical system even though the positive refracting power is weak between the first reflecting power and the second reflecting power.

As in the digital single-lens reflex camera of the twelfth aspect of the present invention, when the positive refracting power is provided between the second reflecting power and the imaging optical system, the positive refracting power can be weakened between the first reflecting surface and the second reflecting surface, and the optical path situated between the second reflecting surface and the light-receiving element can be reduced.

When the positive refracting power is weakened between the first reflecting surface and the second reflecting surface, the observation optical path can be ensured and the observation optical system can be simply constructed even though the refracting power is zero between the second reflecting surface and the third reflecting surface in the observation optical system.

As in the digital single-lens reflex camera of the thirteenth aspect of the present invention, the positive lens is interposed between the second reflecting surface and the imaging optical system, the function of the field lens interposed between the first reflecting surface and the second reflecting surface can be shared.

As in the digital single-lens reflex camera of the fourteenth aspect of the present invention, the camera has the imaging optical system and the light-receiving element on the optical axis located on the transmission side of the path-splitting surface so that the light-receiving element is constructed as the second image sensor converting the object image into the electric signal, and includes the display element for converting the electric signal of the object image formed by the second image sensor to display the image. Whereby, an electronic image having no parallax with respect to a photographed image can be observed.

Further, as in the digital single-lens reflex camera of the fourteenth aspect of the present invention, when the electronic image having no parallax with respect to the photographic image can be observed by the display element provided on the backside of the camera, there is no need to determine composition in photography while confirming the object image through the optical finder as in the conventional digital single-lens reflex camera. Thus, restrictions on the photographing angle and position can be moderated. That is, the digital single-lens reflex camera of the fourteenth aspect of the present invention is capable of determining the composition while observing the object image to photograph, by the electronic image displayed on an image sensor for observation, irrespective of the existence of an image sensor provided with both functions for photography and observation (for example, the through image function).

As in the digital single-lens reflex camera of the fifteenth aspect of the present invention, when the optical axis transmitted through the half mirror is bent by the imaging optical system, the camera can be downsized.

As in the digital single-lens reflex camera of the sixteenth aspect of the present invention, when the optical axis transmitted through the half mirror is bent a plurality of times by the imaging optical system, the camera can be downsized.

As in the digital single-lens reflex camera of the seventeenth aspect of the present invention, when the optical axis transmitted through the half mirror is bent a plurality of times by the imaging optical system, the camera can be downsized.

When the prisms themselves constituting the imaging optical system have the refracting power, the number of optical members constituting the imaging optical system can be reduced.

As in the digital single-lens reflex camera of the eighteenth aspect of the present invention, the optical element is eliminated between the second reflecting surface and the third reflecting surface, and the optical element with refracting power placed on the transmission side of the second reflecting surface is constructed with only a single lens as the imaging optical system. Whereby, the number of optical members constituting the imaging optical system can be reduced and the imaging optical system can be simply constructed.

The digital single-lens reflex camera of the nineteenth aspect of the present invention is such that the photographic lens constructed to be integral with the digital single-lens reflex camera or removable is mounted to the digital single-lens reflex camera, and thereby the image formed on the imaging surface of the image sensor by light rays passing through the photographic lens is converted into the electric signal for processing (for example, image processing or store).

Here, as in the digital single-lens reflex camera of the nineteenth aspect of the present invention, the light ray incident from the photographic lens is reflected by the first reflecting surface, the second reflecting surface, the third reflecting surface, and the fourth reflecting surface in the observation optical system. Whereby, the intermediate image of the object can be observed as an erect image in the same manner that the image of the object can be observed as an erect image through the optical path of the so-called Porro prism or Porro mirror.

Further, as in the digital single-lens reflex camera of the nineteenth aspect of the present invention, when an arrangement is made such that the observation optical path formed by the first, second, third and fourth reflecting surfaces is bent in a plane nearly perpendicular to an incident optical axis, an optical layout that has little influence on the thickness of the camera can be attained.

Still further, as in the digital single-lens reflex camera of the nineteenth aspect of the present invention, the position of the fourth reflecting surface located on the reflection optical axis of the third reflecting surface is shifted so that the position of the reflection optical axis bent by the fourth reflecting surface to enter the eyepiece is shifted. Whereby, the position of the exit window of the finder can be changed, and an optical layout situated at a position where it is easy to use the optical system can be attained.

As in the digital single-lens reflex camera of the nineteenth aspect of the present invention, when the imaging surface has a rectangular shape extending in a horizontal direction and the optical axis bent by the first reflecting surface is rendered parallel to the major side of the imaging surface, an increase in height of the camera can be suppressed.

In the digital single-lens reflex camera of the nineteenth aspect of the present invention, the distance between the first reflecting surface and the intermediate image plane is about equal to the distance between the first reflecting surface and the image sensor. As such, when the distance between the first reflecting surface and the intermediate image plane is reduced, the distance between the first reflecting surface and the image sensor can also be relatively reduced.

Thus, as in the digital single-lens reflex camera of the twentieth aspect of the present invention, when the intermediate image plane is formed between the first reflecting surface and the second reflecting surface, the distance between the first reflecting surface and the image sensor, in contrast with the case where the intermediate image plane is located behind the second reflecting surface, can be reduced. This is advantageous for decreasing the thickness of the camera.

Further, as in the digital single-lens reflex camera of the twentieth aspect of the present invention, the major side of the intermediate image plane formed between the first reflecting surface and the second reflecting surface corresponds to that of the imaging surface and also corresponds to the thickness of the camera. Thus, when the length of the major side of the intermediate image plane is moderated, the thickness of the camera can be decreased.

Still further, as in the digital single-lens reflex camera of the twentieth aspect of the present invention, it is favorable that the intermediate image plane satisfies Conditions (12) and (13), because when the size of the intermediate image plane is too small, it becomes hard to enlarge the observation field.

As in the digital single-lens reflex camera of the twenty-first aspect of the present invention, when the incident optical axis is bent parallel to the major side of the imaging surface by the quick-return mirror, the quick-return mirror is constructed so that it is rotated about the minor side as an axis in the direction of the major side of the imaging surface.

The digital single-lens reflex camera of the twenty-second aspect of the present invention is such that the photographic lens constructed to be integral with the digital single-lens reflex camera or removable is mounted to the digital single-lens reflex camera, and thereby the image formed on the imaging surface of the image sensor by light rays passing through the photographic lens is converted into the electric signal for processing (for example, image processing or store).

Here, as in the digital single-lens reflex camera of the twenty-second aspect of the present invention, the light ray incident from the photographic lens is reflected by the first reflecting surface, the second reflecting surface, the third reflecting surface, and the fourth reflecting surface in the observation optical system. Whereby, the intermediate image of the object can be observed as an erect image in the same manner that the image of the object can be observed as an erect image through the optical path of the so-called Porro prism or Porro mirror.

Further, as in the digital single-lens reflex camera of the twenty-second aspect of the present invention, when an arrangement is made such that the observation optical path formed by the first, second, third and fourth reflecting surfaces is bent in a plane nearly perpendicular to an incident optical axis, an optical layout that has little influence on the thickness of the camera can be attained.

Still further, as in the digital single-lens reflex camera of the twenty-second aspect of the present invention, the position of the fourth reflecting surface located on the reflection optical axis of the third reflecting surface is shifted so that the position of the reflection optical axis bent by the fourth reflecting surface to enter the eyepiece is shifted. Whereby, the position of the exit window of the finder can be changed, and an optical layout situated at a position where it is easy to use the optical system can be attained.

As in the digital single-lens reflex camera of the twenty-second aspect of the present invention, when the intermediate image is formed between the first reflecting surface and the second reflecting surface, and the positive refracting power is provided between the first reflecting surface and the second reflecting surface, an off-axis beam of light of the image plane is inclined toward the optical axis side and succeeding optical systems can be easily downsized.

Further, as in the digital single-lens reflex camera of the twenty-second aspect of the present invention, when the negative refracting power is provided between the second reflecting surface and the third reflecting surface, the convergence of the off-axis beam can be lessened, or the off-axis beam can be diverged. Consequently, even though the positive refracting power is extremely strengthened between the first reflecting surface and the second reflecting surface, space in which the reflecting surface for image inversion is placed and the eyepoint can be ensured.

As in the digital single-lens reflex camera of the twenty-third aspect of the present invention, it is desirable to satisfy Conditions (14) and (15).

As in the digital single-lens reflex camera of the twenty-fourth aspect of the present invention, when the field lens with positive refracting power is interposed between the first reflecting surface and the second reflecting surface, and the negative lens is interposed between the second reflecting surface and the third reflecting surface, the refracting power required between individual reflecting surfaces can be ensured.

As in the digital single-lens reflex camera of the twenty-fifth aspect of the present invention, when the field lens has the Fresnel surface with positive refracting power and the screen surface, the number of elements can be reduced and the compact design of the camera can be attained.

Also, the digital single-lens reflex camera of the present invention may be designed so that at least two of the aspects of the digital single-lens reflex camera mentioned above are satisfied simultaneously.

In accordance with the drawings, the embodiments of the present invention will be described below.

First Embodiment

FIG. 1 shows the optical arrangement of the eyepiece of the first embodiment in the present invention. In FIG. 1, reference numeral 3 represents a primary imaging plane and 6 represents the image plane of the object in the eyepiece. FIGS. 2A-2L show aberration characteristics in the first embodiment.

Figure 8:
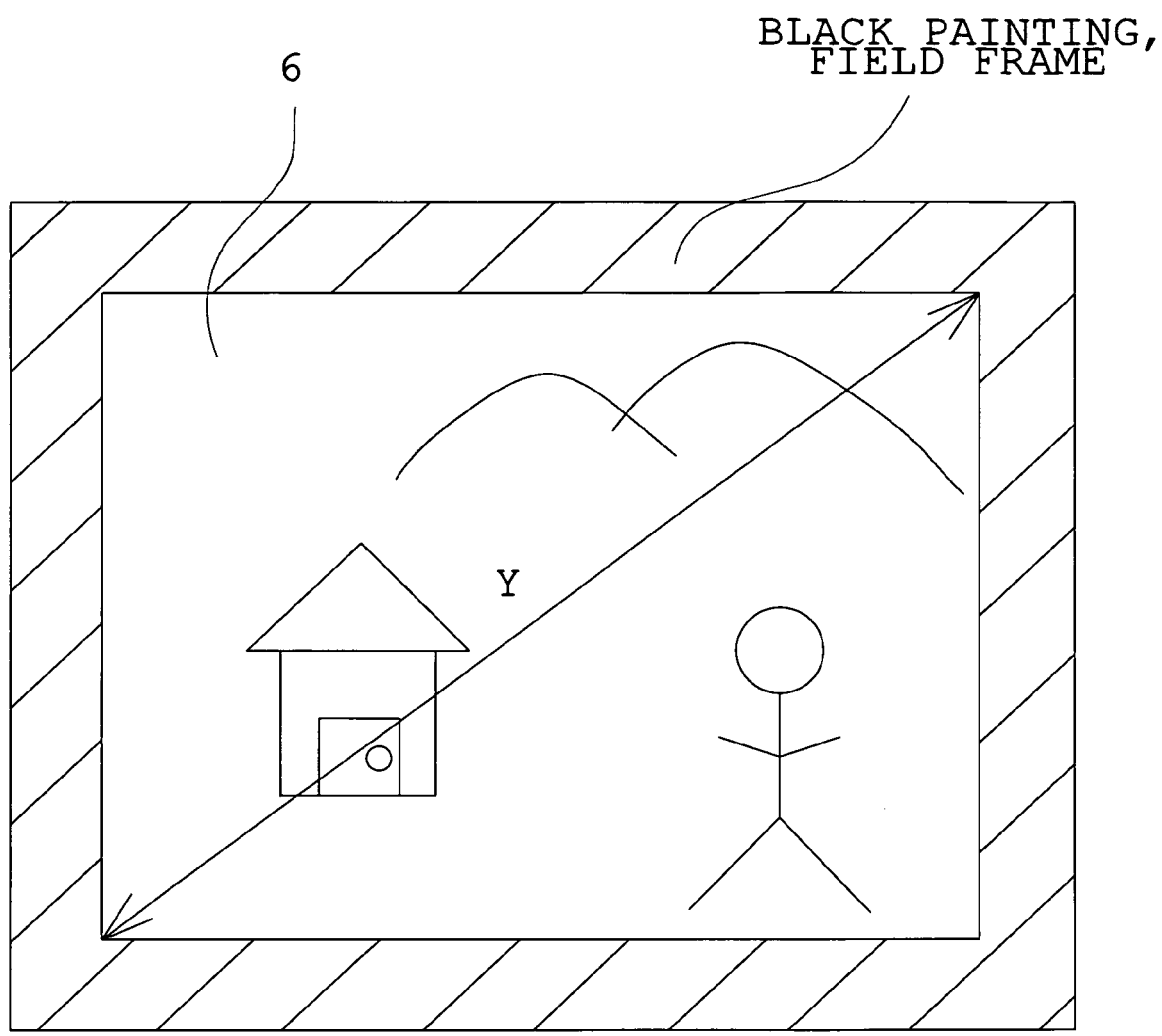
FIG. 8 is an explanatory view showing the diagonal length of the image plane in an observable range on the surface of an image of an object of a primary imaging plane.

Also, in the aberration diagrams, the axis of abscissas in spherical aberration and distortion is a diopter ($m^{-1}$) and the axis of abscissas in chromatic aberration of magnification is an angle (degree). These are also used in the aberration diagrams of the embodiments to be described below. The image plane 6 in FIGS. 1, 3, and 5, as shown in FIG. 8, is provided with a frame for restricting the field area (for example, black painting or a field frame) on or in the proximity of the image plane 6. In FIG. 8, reference symbol Y denotes an image plane diagonal length in an observable area on the image plane 6. The primary imaging plane may be constructed so that the image is projected on a ground glass surface or a minute-prism array.

An eyepiece 1 of the first embodiment comprises, in order from the observation plane side (the object side), a first lens unit G1 including a convex meniscus lens (a first lens) with a convex surface facing the object side, a second lens unit G2 including a convex meniscus lens (a second lens) whose object-side surface is aspherical, and a third lens unit G3 including a biconcave lens (a third lens). The first embodiment is constructed so that the diopter adjustment is made by moving the second lens unit G2.

Also, when z is taken as the coordinate in the direction of the optical axis, y is taken as the coordinate normal to the optical axis, k represents a conic constant, and $A_4$, $A_6$, $A_8$, and $A_{10}$ represent aspherical coefficients, the configuration of an aspherical surface in the present invention is expressed by the following equation:

$$z=(y^2/r)/[1+\{1-(1+k)\cdot(y/r)^2\}^{1/2}]+A_4y^4+A_6y^6+A_8y^8+A_{10}y^{10}+\ldots$$

These hold for numerical data of the embodiments to be described below.

Subsequently, numerical data of optical members constituting the eyepiece of the first embodiment are shown below.

Numerical Data 1

Diopter (m$^{-1}$) = +1.5~−1.0~−3.5
Focal length f1 (mm) = 47.01~51.16~57.18
Pupil diameter (mm) = 8
Image plane diagonal length Y (mm) = 21.8
Back focus fb = 1.58f

| Surface number | Radius of curvature | Face-to-face (or air) spacing | d line refractive index | Abbe's number |
|---|---|---|---|---|
| 1 | ∞ (Image plane of the object) | 81.04 | | |
| 2 | 14.411 | 6.88 | 1.52542 | 55.78 |
| 3 | 47.997 | D3 | | |
| 4 | (Aspherical surface) | 4.67 | 1.52542 | 55.78 |
| 5 | 844.301 | D5 | | |
| 6 | −56.145 | 1.80 | 1.58423 | 30.49 |
| 7 | 9.374 | 23.18 | | |
| 8 | Pupil | | | |

Aspherical coefficients
Fourth surface

| Radius of curvature | 14.882 | |
|---|---|---|
| k = 0 | | |
| $A_4 = -3.88899 \times 10^{-5}$ | $A_6 = -1.90488 \times 10^{-7}$ | |
| $A_8 = -1.83346 \times 10^{-9}$ | | |

| Diopter | +1.5 | −1.0 | −3.5 |
|---|---|---|---|
| D3 | 1.07 | 1.52 | 2.13 |
| D5 | 2.14 | 1.63 | 1.01 |

Second Embodiment

Figure 3:
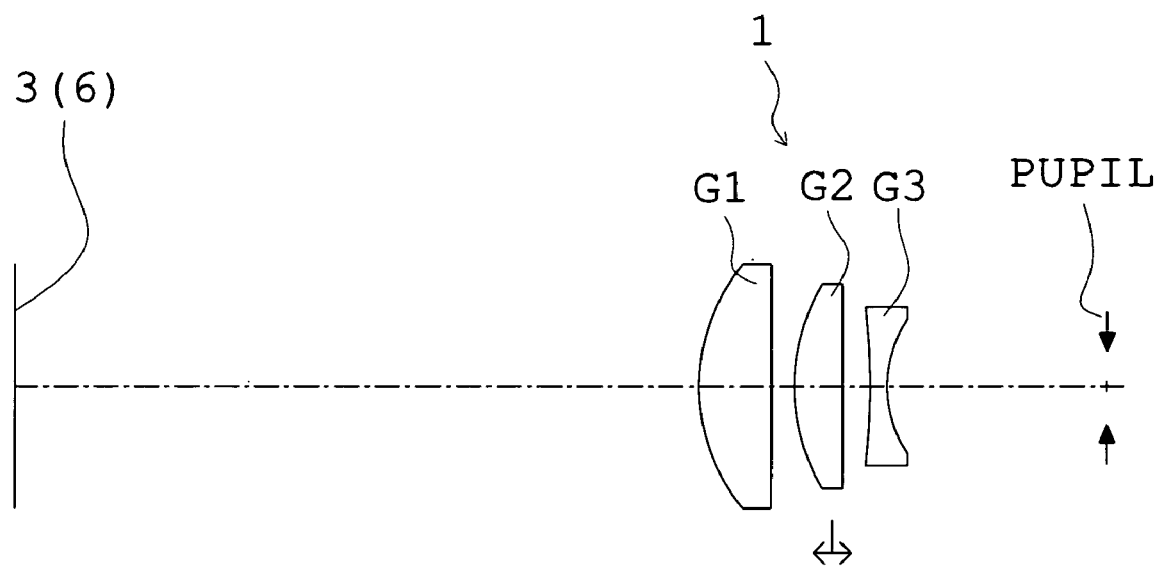
FIG. 3 is a sectional view showing an optical arrangement, developed along the optical axis, of a second embodiment in the present invention.

FIG. 3 shows the optical arrangement of the eyepiece of the second embodiment in the present invention. FIGS. 4A-4L show aberration characteristics in the second embodiment.

The eyepiece 1 of the second embodiment comprises, in order from the observation plane side (the object side), the first lens unit G1 including the convex meniscus lens (the first lens) with a convex surface facing the object side, the second lens unit G2 including a biconvex lens (the second lens) whose object-side surface is aspherical, and the third lens unit G3 including the biconcave lens (the third lens). The second embodiment is constructed so that the diopter adjustment is made by moving the second lens unit G2.

Subsequently, numerical data of optical members constituting the eyepiece of the second embodiment are shown below.

Numerical Data 2

Diopter (m$^{-1}$) = +1.0~−1.0~−3.0
Focal length f1 (mm) = 46.25~50.00~55.25
Pupil diameter (mm) = 8
Image plane diagonal length Y (mm) = 22.5
Back focus fb = 1.44f

| Surface number | Radius of curvature | Face-to-face (or air) spacing | d line refractive index | Abbe's number |
|---|---|---|---|---|
| 1 | ∞ (Image plane of the object) | 72.13 | | |
| 2 | 20.932 | 7.80 | 1.51633 | 64.14 |
| 3 | 1012.061 | D3 | | |
| 4 | (Aspherical surface) | 5.22 | 1.52542 | 55.78 |
| 5 | −782.022 | D5 | | |
| 6 | −68.933 | 1.80 | 1.58423 | 30.49 |
| 7 | 13.879 | 23.30 | | |
| 8 | Pupil | | | |

Aspherical coefficients
Fourth surface

| Radius of curvature | 21.015 | |
|---|---|---|
| k = 0 | | |
| $A_4 = -1.47489 \times 10^{-5}$ | $A_6 = -3.77827 \times 10^{-8}$ | |
| $A_8 = -2.49840 \times 10^{-10}$ | | |

| Diopter | +1.0 | −1.0 | −3.0 |
|---|---|---|---|
| D3 | 1.85 | 2.69 | 3.71 |
| D5 | 3.66 | 2.81 | 1.79 |

Third Embodiment

Figure 5:
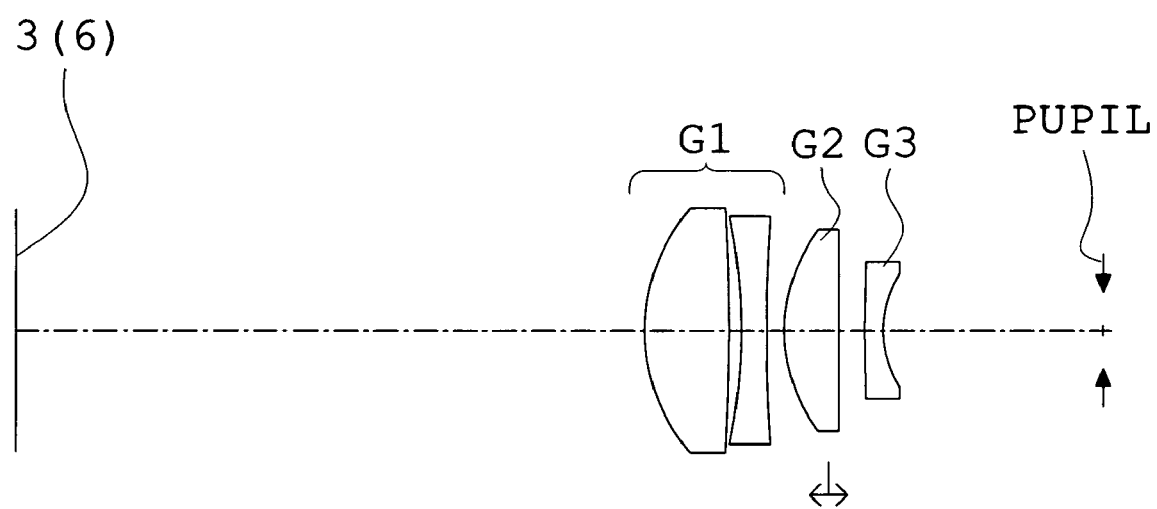
FIG. 5 is a sectional view showing an optical arrangement, developed along the optical axis, of a third embodiment in the present invention.

FIG. 5 shows the optical arrangement of the eyepiece of the third embodiment in the present invention. FIGS. 6A-6L show aberration characteristics in the third embodiment.

The eyepiece 1 of the third embodiment comprises, in order from the observation plane side (the object side), the first lens unit G1 including a biconvex lens (the first lens) and a biconcave lens (the second lens), the second lens unit G2 including the biconvex lens (the third lens) whose object-side surface is aspherical, and the third lens unit G3 including a concave meniscus lens (a fourth lens). The third embodiment is constructed so that the diopter adjustment is made by moving the second lens unit G2.

Subsequently, numerical data of optical members constituting the eyepiece of the third embodiment are shown below.

Numerical Data 3

Diopter (m$^{-1}$) = +1.0~−1.0~−3.0
Focal length f1 (mm) = 42.03~45.50~50.38
Pupil diameter (mm) = 8
Image plane diagonal length Y (mm) = 21.9
Back focus fb = 1.43f

| Surface number | Radius of curvature | Face-to-face (or air) spacing | d line refractive index | Abbe's number |
|---|---|---|---|---|
| 1 | ∞ (Image plane of the object) | 65.80 | | |
| 2 | 19.909 | 8.85 | 1.52542 | 55.78 |
| 3 | −303.851 | 1.19 | | |
| 4 | −61.823 | 2.80 | 1.58423 | 30.49 |
| 5 | 195.037 | D5 | | |
| 6 | (Aspherical surface) | 5.55 | 1.52542 | 55.78 |
| 7 | −519.338 | D7 | | |
| 8 | 141.796 | 1.80 | 1.58423 | 30.49 |
| 9 | 11.216 | 23.18 | | |
| 10 | Pupil | | | |

Aspherical coefficients
Sixth surface

Radius of curvature    16.231
k = 0
$A_4 = -2.8938 \times 10^{-5}$    $A_6 = -9.5378 \times 10^{-8}$
$A_8 = -3.1054 \times 10^{-10}$

| Diopter | +1.0 | −1.0 | −3.0 |
|---|---|---|---|
| D5 | 0.80 | 1.70 | 2.79 |
| D7 | 3.45 | 2.55 | 1.46 |

In general, the finder optical system requires optical members for inverting the image. Hence, space for arranging image inverting optical members in the optical body must be ensured. Many single-lens reflex cameras use pentagonal roof prisms as the image inverting optical members.

Figure 7A:
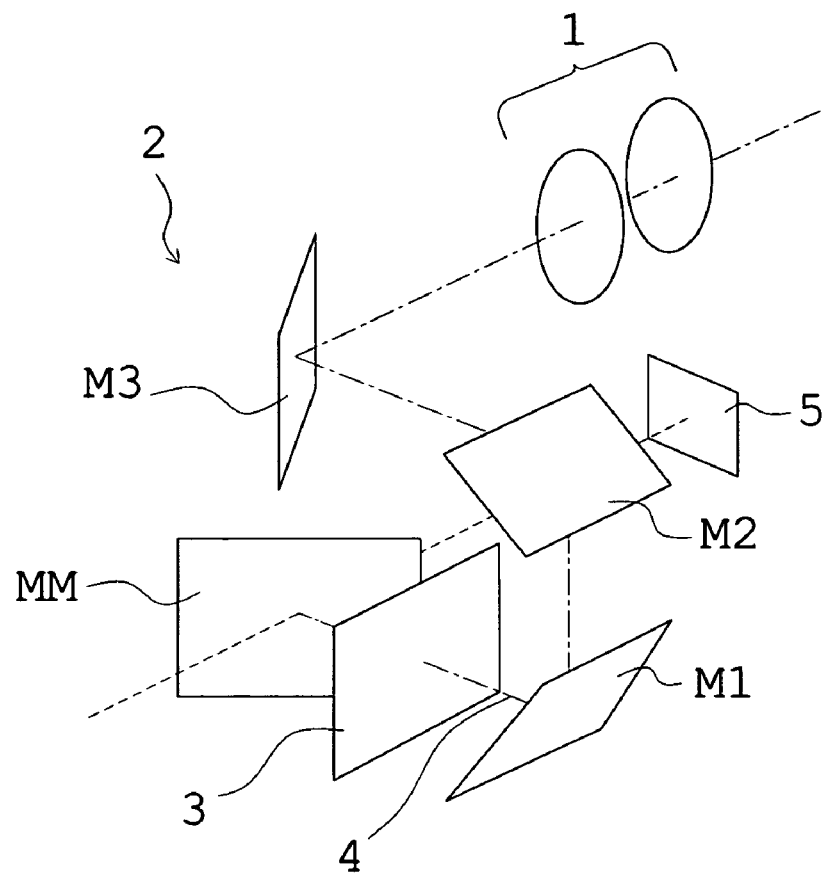
FIG. 7A is a perspective view showing the arrangement of image inverting members for explaining the single-lens reflex camera having a Porro-type image inverting optical system.
Figure 7B:
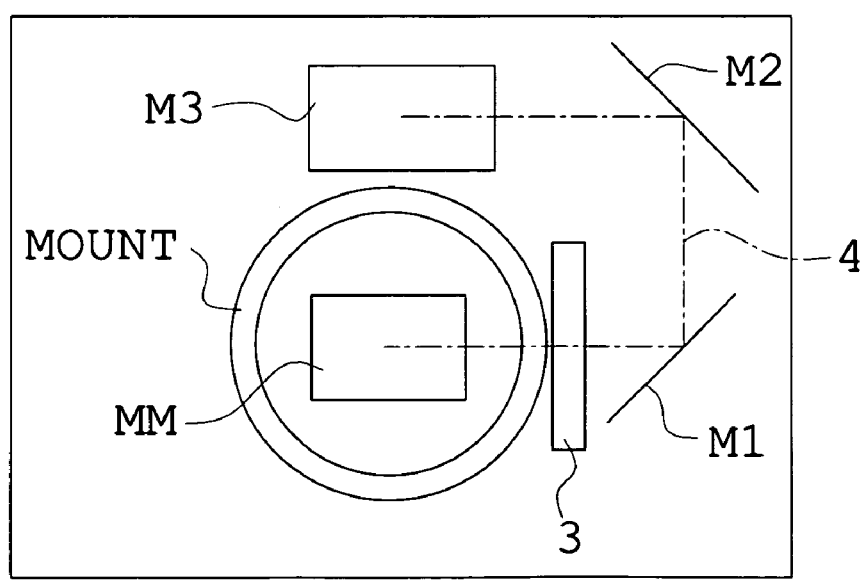
FIG. 7B is a front view of FIG. 7A.

In such optical members for inverting the image, the finder optical system of the present invention comprises a first reflecting surface reflecting a light beam emerging from a photographing optical system in a longitudinal direction of a camera body, an image forming section placed on the reflection side of the first reflecting surface in the proximity of a primary imaging plane formed by the photographing optical system, and a plurality of reflecting surfaces and an eyepiece, arranged on the pupil side of the primary imaging plane. The first reflecting surface and the plurality of reflecting surfaces constitute a Porro-type image inverting optical system. FIGS. 7A and 7B illustrate the finder optical system of the single-lens reflex camera having the Porro-type image inverting optical system.

In FIGS. 7A and 7B, a finder optical system 2 has the Porro-type image inverting optical system including a main mirror MM, the primary imaging plane 3, mirrors M1, M2, and M3 that are reflecting surfaces, and the eyepiece 1.

The primary imaging plane 3 is located on the reflection side of the main mirror MM (at a position on the pupil side along an optical axis 4 of the finder system), and the mirrors M1, M2, and M3 that are reflecting surfaces are arranged on the pupil side of the primary imaging plane 3 (at a position on the pupil side along the optical axis 4 of the finder system).

Whereby, the image of the photographing optical system is formed as an erect image by four reflecting surfaces, including the main mirror MM located in front (on the object side) of the primary imaging plane 3.

Now, a description is given of the image inversion of the photographing optical system. When the visual field is observed through the finder, a light beam passing through the photographing optical system is reflected by the main mirror MM that is the quick-return mirror to form an image on the primary imaging plane 3. This image is inverted by the three reflecting surfaces M1, M2, and M3 in the finder optical system and is introduced into the pupil through the eyepiece 1.

In photography, the main mirror MM is retired in a direction opposite to the primary imaging plane 3 so that the image of the photographing optical system reaches an image sensor 5 such as a CCD.

When the image inverting optical members are constructed as mentioned above, the projection of a roof portion is absent, in contrast with a finder optical system where pentagonal roof prisms are used, and thus a camera body that is compact in height and slim can be obtained.

Furthermore, the compact design of the entire camera is attained, and in spite of the fact that the single-lens reflex camera is used, a camera of size similar to a compact camera can be realized.

In addition to the Porro-type image inverting optical system in which the mirrors are arranged like the present invention, Porro prisms and pentagonal roof prisms in the prior art are considered as the optical members for image inversion. However, even though any members are arranged, sufficient space is ensured.

In the finder optical system of the present invention, the three reflecting surfaces locate on the pupil side of the primary imaging plane are constructed as mirrors, but the present invention is not limited to this arrangement. For example, instead of the mirrors, prisms may be used as the three reflecting surfaces.

Also, in the above embodiments, in order to arrange the optical members for image inversion such as Porro mirrors, a distance from the primary imaging plane of the photographic lens that is a non-observation plane to the first lens unit of the eyepiece is sufficiently ensured.

Numerical values of the conditions in the embodiments are listed in a table shown below.

| Condition | First embodiment | Second embodiment | Third embodiment |
|---|---|---|---|
| (1) | 0.72 | 0.83 | — |
| (2) | −1.33 | −1.12 | — |
| (3) | −0.27 | −0.39 | — |
| (4) | −1.858 | −1.042 | — |
| (5) | — | — | 1.23 |
| (6) | — | — | 0.79 |
| (7) | — | — | −1.11 |
| (8) | — | — | −0.46 |
| (9) | — | — | −0.877 |
| (10) | 3.70 | 3.21 | 3.01 |
| (11) | 21.9 | 22.5 | 21.9 |

By the present invention, the eyepiece of a long back focus can be provided. Furthermore, for a camera in which the frame size is about a half of the 35 mm silver-halide film, the eyepiece in which the back focus of the eyepiece with a focal length f is as long as nearly 1.4 f, the finder magnification and the eyepoint are high, and a good view is afforded can be provided.

Figure 9A:
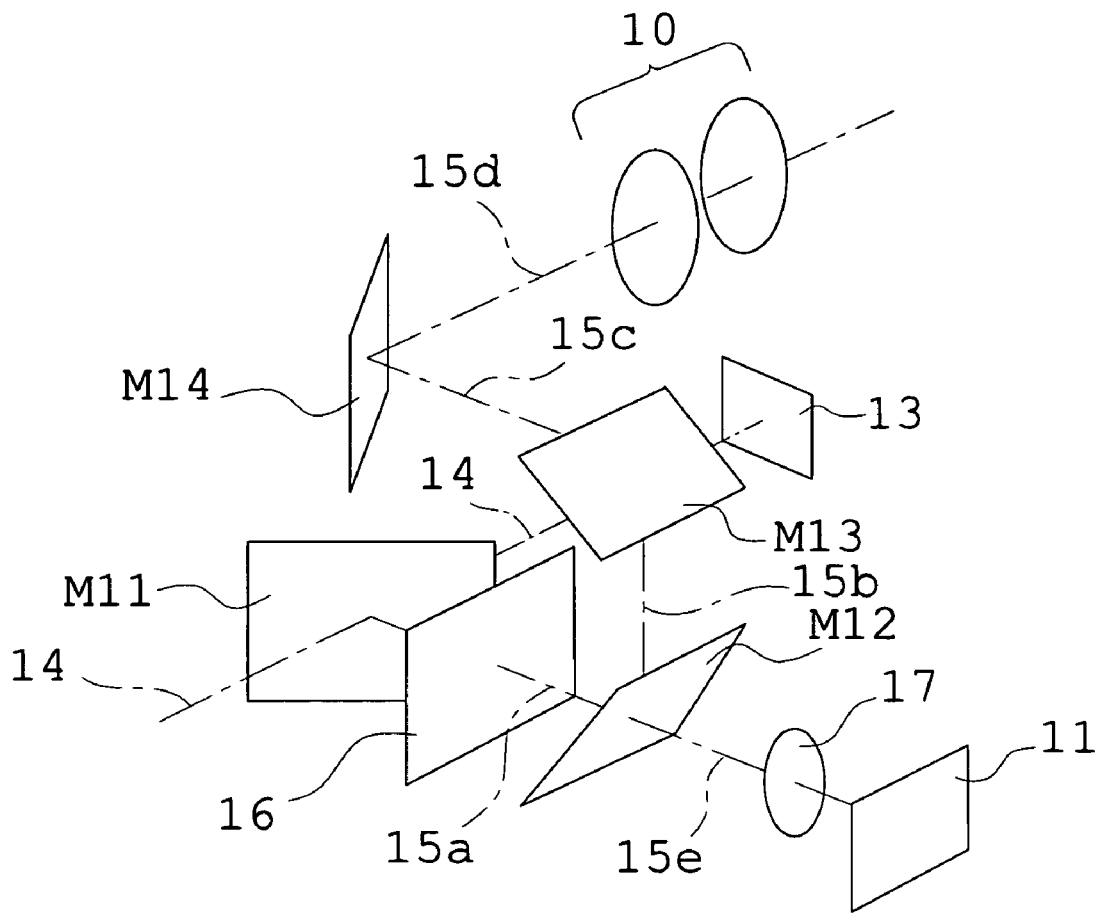
FIG. 9A is a perspective view showing a fundamental arrangement, viewed from the object side, of a digital single-lens reflex camera having the observation optical system of the present invention.
Figure 9B:
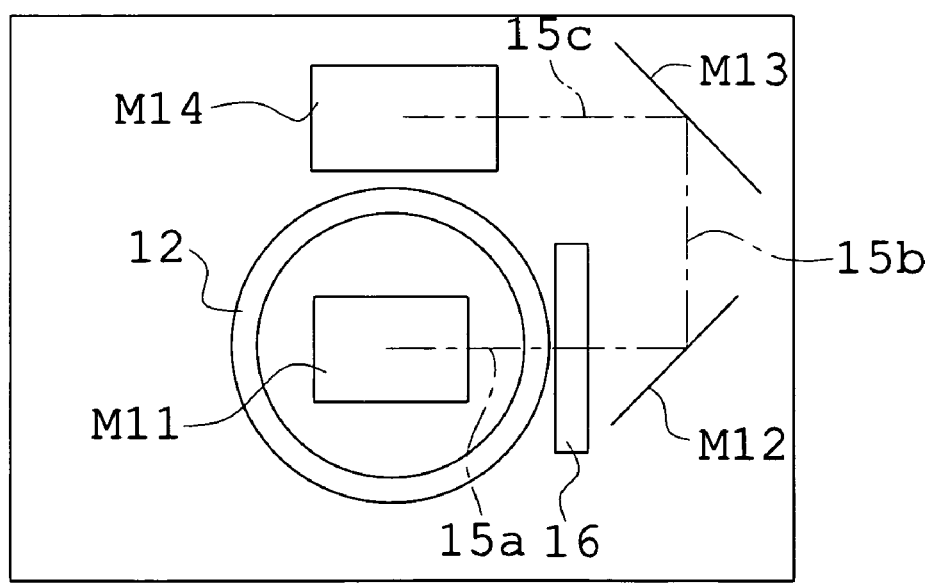
FIG. 9B is a front view of FIG. 9A.

FIGS. 9A and 9B show the fundamental arrangement of the digital single-lens reflex camera having the observation optical system of the present invention.

As shown in FIGS. 9A and 9B, the digital single-lens reflex camera of the present invention is provided with an image sensor 13 and the observation optical system.

The observation optical system includes an image inverting optical system, a path-splitting surface, an imaging optical system 17, and an eyepiece system 10 to observe the intermediate image of the object formed at a position nearly equivalent to the imaging surface.

The image inverting optical system includes, in order from the object side, a first reflecting surface M11, a second reflecting surface M12, a third reflecting surface M13, and a fourth reflecting surface M14.

The first reflecting surface M11 is used as the quick-return mirror which is placed on an incident optical axis 14 of the image sensor 13 in observation so that the incident optical axis 14 is bent parallel to the major side of the imaging surface and which is rotated about the minor side as an axis to retire in the direction of the major side of the imaging surface in photography.

The second reflecting surface M12 is constructed as a half mirror and has the function of the path-splitting surface. Moreover, the second reflecting surface M12 is placed on an optical axis 15a bent by the first reflecting surface M11 and in a direction in which the optical axis incident plane (a plane containing the incident optical axis and the bent optical axis) of the second reflecting surface intersects with that of the first reflecting surface.

The third reflecting surface M13 is placed on an optical axis 15b bent by the second reflecting surface M12 so that the optical axis 15b bent by the second reflecting surface 12M is bent in a direction opposite to the traveling direction of a light ray incident on the second reflecting surface M12 and parallel to the optical axis 15a bent by the first reflecting surface M11.

The fourth reflecting surface M14 is placed on an optical axis 15c bent by the third reflecting surface M13 so that the optical axis 15c bent by the third reflecting surface M13 is bent in the same direction as the traveling direction of the light ray incident on the first reflecting surface M11 and parallel to the incident optical axis 14 on the first reflecting surface M11.

The path-splitting surface is one of the second reflecting surface M12, the third reflecting surface M13, and the fourth reflecting surface M14 and is placed on the optical path from the first reflecting surface M11 to the fourth reflecting surface m14 in the image inverting optical system. For convenience, in FIGS. 9A and 9B, the second reflecting surface M12 is constructed as the path-splitting surface.

The imaging optical system 17 is placed on an optical axis 15e on the transmission side of the path-splitting surface, of optical paths split by the path-splitting surface.

The eyepiece system 10 is placed on an optical axis 15d bent by the fourth reflecting surface M14.

According to the digital single-lens reflex camera that has the fundamental arrangement of the optical members constituting the observation optical system of the present invention, the light ray of the object image passing through the photographic lens is reflected parallel to the major side of the imaging surface by the first reflecting surface M11 located in the middle of the optical path. The ray reflected by the first reflecting surface M11 is imaged at the position of an intermediate image plane 16 and is incident on the half mirror M12. The ray reflected by the half mirror M12 is incident on the third reflecting surface M13. The ray reflected by the third reflecting surface M13 is incident on the fourth reflecting surface M14, along a direction opposite to the traveling direction of the ray entering the half mirror M12 and parallel to the optical axis 15a bent by the first reflecting surface M11. The ray reflected by the fourth reflecting surface M14 is incident on the eyepiece system 10, along the same direction as the traveling direction of the ray entering the first reflecting surface M11 and parallel to the incident optical axis 14 on the first reflecting surface M11. The image is introduced into the finder through the eyepiece system 10 and is observed as an erect image.

On the other hand, a light ray transmitted though the path-splitting surface is conducted to a light-receiving element 11 through the imaging optical system 17 placed on the optical axis 15e on the transmission side of the path-splitting surface.

An electric signal of the object image formed on the light-receiving element 11 is transferred to a display element provided on the backside of the camera and the electronic image of the object image is displayed on a display screen. As a result, a photographer is capable of photographing the object image while viewing a photographing image, apart from the finder, displayed on a liquid crystal display provided on the backside of the camera.

In photography, the quick-return mirror M11 is rotated about its minor side as an axis to retire in the direction of the major side of the imaging surface. The ray of the object image passing through the photographic lens is conducted to the image sensor 13 and is imaged.

Fourth Embodiment

Figure 10:
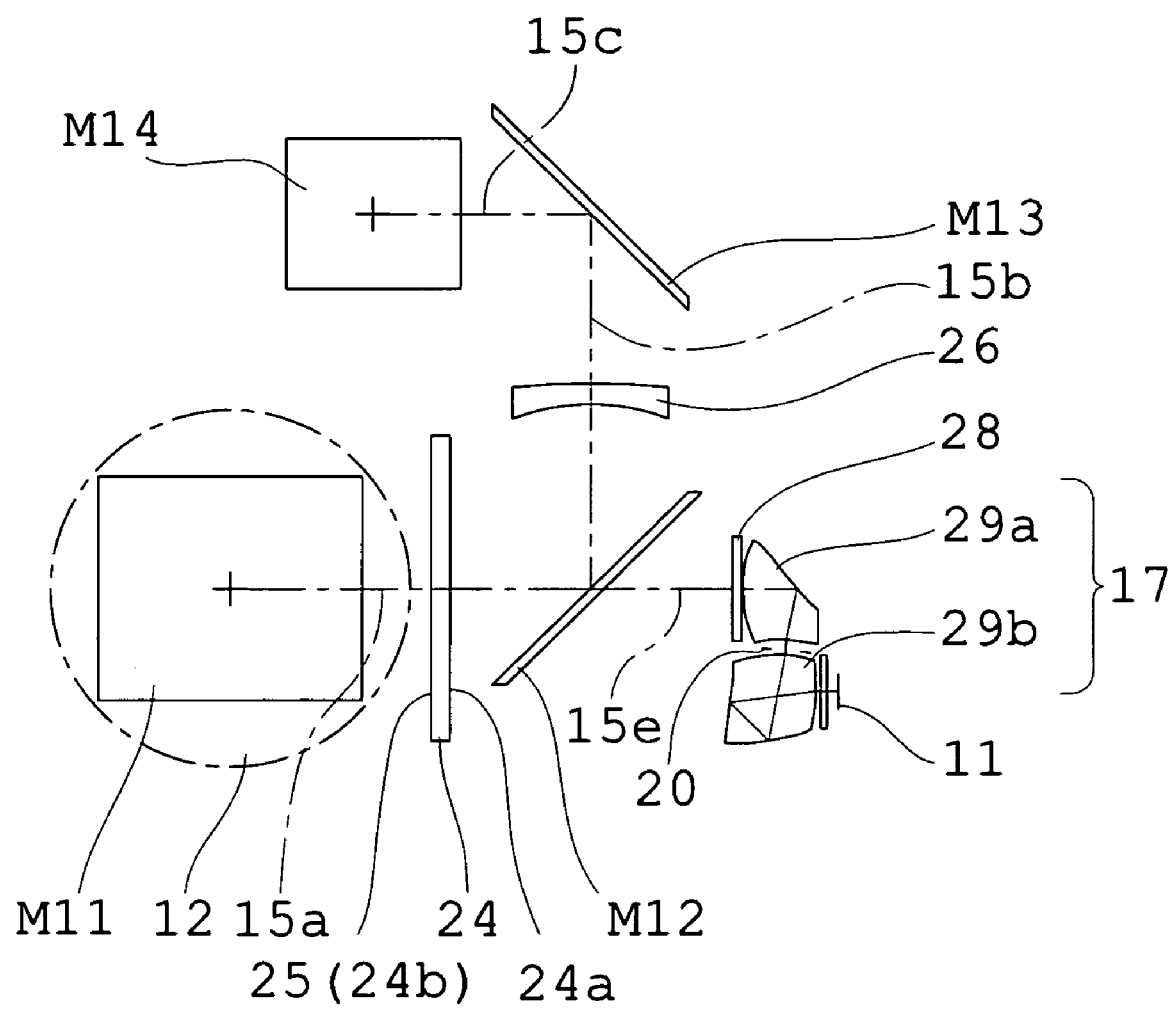
FIG. 10 is an explanatory view showing the layout, viewed from the object side, of the digital single-lens reflex camera of a fourth embodiment in the present invention.

FIG. 10 shows the layout of the digital single-lens reflex camera of the fourth embodiment in the present invention.

Figure 11:
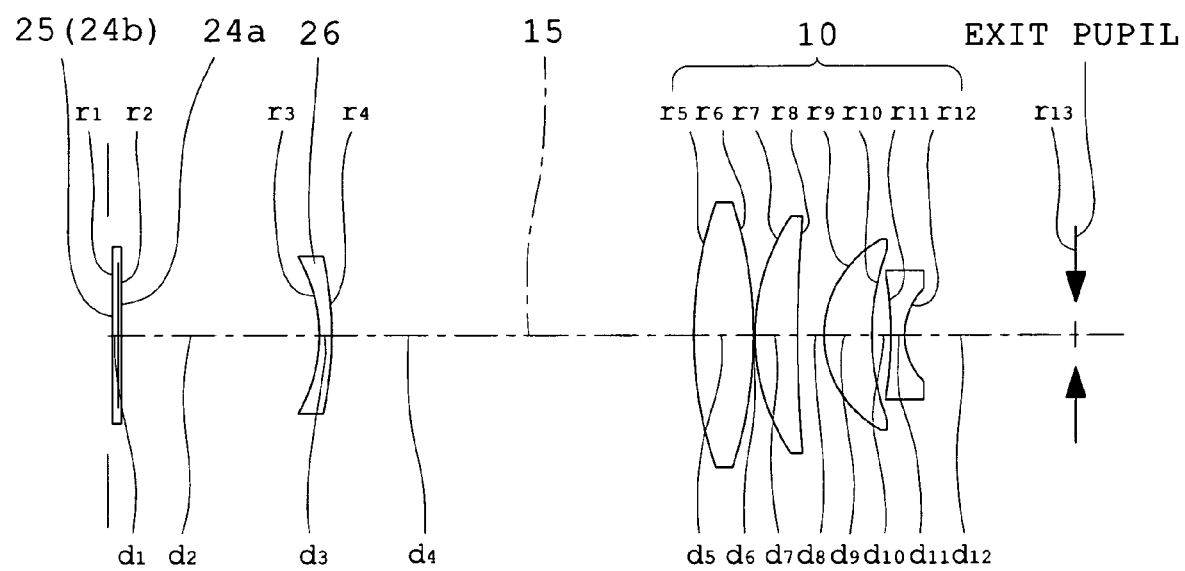
FIG. 11 is a sectional view showing an optical arrangement ranging from a screen surface to an exit pupil, developed along the optical axis, by eliminating a first reflecting surface, a second reflecting surface, a third reflecting surface, and a fourth reflecting surface from the observation optical system of the digital single-lens reflex camera of each of the fourth embodiment and a seventh embodiment in the present invention.

FIG. 11 shows an optical arrangement ranging from a screen surface 24b to the exit pupil, developed along the optical axis, by eliminating the first reflecting surface M11, the second reflecting surface M12, the third reflecting surface M13, and the fourth reflecting surface M14 from the observation optical system of the digital single-lens reflex camera of the fourth embodiment.

As shown in FIG. 10, the digital single-lens reflex camera of the fourth embodiment of the present invention has the fundamental arrangement of the observation optical system of the digital single-lens reflex camera in the present invention shown in FIGS. 9A and 9B and is constructed so that a field lens with positive refracting power is interposed between the first reflecting surface M11 and the half mirror M12, and a meniscus-shaped negative lens 26 with negative refracting power, with a concave surface facing the object side, is interposed between the half mirror M12 and the third reflecting surface M13.

In the digital single-lens reflex camera of the fourth embodiment of the present invention, the imaging optical system 17 is constructed with two prisms 29a and 29b provided with free-formed surfaces. In the imaging optical system 17, therefore, even when space situated behind the half mirror M12 is limited, good imaging performance can be obtained without using many lenses. Moreover, since the two prisms 29a and 29b are provided with reflecting surfaces, the structure of the imaging optical system 17 can be made compact by bending the optical axis.

Further, in the digital single-lens reflex camera of the fourth embodiment of the present invention, the field lens with positive refracting power is interposed between the first reflecting surface M11 and the half mirror M12. The field lens is constructed as a Fresnel lens 24 with positive refracting power that has a Fresnel lens surface 24a with positive refracting power on the pupil side and the screen surface 24b on the object side. In the Fresnel lens surface 24a, the Fresnel lens surface with positive refracting power on the pupil side may be changed to an optical function surface such as a refracting surface with positive refracting power with a convex surface facing the pupil side. The screen surface 24b is constructed with a screen mat 25 and is located at the position of the intermediate image plane 16. For example, ground glass, a minute-prism array, or a hologram screen may be used for the screen surface 24b so that the image is projected thereon.

In the digital single-lens reflex camera of each of the fourth and seventh embodiments of the present invention, the meniscus-shaped negative lens 26 with negative refracting power, with a concave surface facing the object side, is interposed between the half mirror M12 and the third reflecting surface M13. Also, in order to lessen the function of the field lens, it is desirable that the negative lens 26 is located immediately behind the half mirror M12.

Subsequently, numerical data of optical members constituting the digital single-lens reflex camera of each of the fourth and seventh embodiments of the present invention are shown below.

Here, in the numerical data, $r_1, r_2, \ldots$ represent radii of curvature (mm) of surfaces of individual optical members; $d_1, d_2, \ldots$ represent thicknesses of individual optical members or spacings (mm) between them; $n_{d1}, n_{d2}, \ldots$ represent refractive indices at a wavelength (587.6 nm) of the d line of individual optical members; and $v_{d1}, v_{d2}, \ldots$ represent Abbe's numbers at a wavelength (587.6 nm) of the d line of individual optical members.

Also, fF is the focal length of the Fresnel lens 24 interposed between the first reflecting surface M11 and the second reflecting surface M12; fN is the focal length of the negative lens 26 interposed between the second reflecting surface M12 and the third reflecting surface M13; fe is the focal length of the optical system constructed with the optical members of the Fresnel lens 24, the second reflecting surface M12, the negative lens 26, the third reflecting surface M13, and the fourth reflecting surface M14; Y is the diagonal length of the intermediate image plane 16; V is the length of the minor side of the intermediate image plane 16; and H is the length of the major side of the intermediate image plane 16.

These symbols also hold for Numerical data 5 of the seventh embodiment to be described later.

Although the positions of the first to fourth reflecting surfaces are not described as numerical values, individual reflecting surfaces are constructed as plane reflecting surfaces. The first reflecting surface M11 is located on the object side of the first surface of Numerical data 4. The second reflecting surface M12 is placed within 4.8700 mm in the spacing between the second surface of Numerical data 4 and the third surface of Numerical data 4. The third reflecting surface M13 and the fourth reflecting surface M14 are arranged within 9.7900 mm in the spacing between the fourth surface of Numerical data 4 and the fifth surface of Numerical data 4. Each reflecting surface is placed in such a manner that the observation optical path is ensured by making proper adjustment.

The first surface and the second surface of Numerical data 4 are both described as "INF" ($\infty$). The first surface of Numerical data 4 is the screen surface 24b and is located at the position of the intermediate image plane 16 equivalent to the position of the imaging surface.

The second surface of Numerical data 4 is constructed as the Fresnel lens surface 24a with positive refracting power.

The lens of the eyepiece system 10 is moved to make the diopter adjustment. When the diopter ($m^{-1}$) of Numerical data 4 is adjusted to +1.0 diopter, a spacing D1 is 2.88602 mm and a spacing D2 is 2.77354 mm. When the diopter ($m^{-1}$) is adjusted to −1.0 diopter, the spacing D1 is 3.26619 mm and the spacing D2 is 2.39347 mm. When the diopter ($m^{-1}$) is adjusted to −3.0 diopter, the spacing D1 is 3.71391 mm and the spacing D2 is 1.94744 mm.

The ninth surface and the eleventh surface are both aspherical. The conic constant k of the ninth surface is zero. The fourth order aspherical coefficient $A_4$ is $1.9502 \times 10^{-6}$, the sixth order aspherical coefficient $A_6$ is $-2.0711 \times 10^{-8}$, and the eighth order coefficient $A_8$ is $1.0096 \times 10^{-10}$.

The conic constant k of the eleventh surface is zero. The fourth order aspherical coefficient $A_4$ is $1.1485 \times 10^{-4}$, the sixth order aspherical coefficient $A_6$ is $-5.8005 \times 10^{-7}$, and the eighth order coefficient $A_8$ is $1.5471 \times 10^{-9}$.

The Fresnel lens 24 is designed to have the focal length fF of 35 mm. The negative lens 26 has the focal length fN of −58.0 mm. The optical system including the Fresnel lens 24, the second reflecting surface M12, the negative lens 26, the third reflecting surface M13, and the fourth reflecting surface M14, located behind the intermediate image, is designed to have the focal length fe of 48 mm. The length V of the minor side of the intermediate image plane 16 is 12.3 mm, while the length H of the major side of the intermediate image plane 16 is 16.4 mm. The diagonal length Y of the intermediate image plane 16 in this case is such as to be 20.5 mm.

The ratio of the focal length fF of the Fresnel lens 24 to the focal length fe of the optical system including the Fresnel lens 24, the second reflecting surface M12, the negative lens 26, the third reflecting surface M13, and the fourth reflecting surface M14, located behind the primary imaging plane, is designed to be 0.73.

The ratio of the focal length fN of the negative lens 26 to the diagonal length Y of the intermediate image plane 16 is −2.83. The ratio of the length H of the major side of the intermediate image plane 16 to the length V of the minor side of the intermediate image plane 16 is 1.33.

Numerical Data 4

| | | | |
|---|---|---|---|
| $r_1$ = INF (Screen surface) | $d_1$ = 1.5000 | $n_{d1}$ = 1.51633 | $v_{d1}$ = 64.14 |
| $r_2$ = INF (Fresnel lens surface) | $d_2$ = 24.8700 | | |
| $r_3$ = −19.9875 | $d_3$ = 1.5163 | $n_{d3}$ = 1.51633 | $v_{d3}$ = 64.14 |
| $r_4$ = −61.6237 | $d_4$ = 46.7900 | | |
| $r_5$ = 54.9375 | $d_5$ = 7.8000 | $n_{d5}$ = 1.51633 | $v_{d5}$ = 64.14 |
| $r_6$ = −56.2405 | $d_6$ = 0.2118 | | |
| $r_7$ = 28.1467 | $d_7$ = 5.4932 | $n_{d7}$ = 1.51633 | $v_{d7}$ = 64.14 |
| $r_8$ = 296.1988 | $d_8$ = D1 (variable) | | |
| $r_9$ = 14.121 (Aspherical surface) | $d_9$ = 6.2572 | $n_{d9}$ = 1.52542 | $v_{d9}$ = 55.78 |
| $r_{10}$ = 36.1049 | $d_{10}$ = D2 (variable) | | |
| $r_{11}$ = −31.4023 (Aspherical surface) | $d_{11}$ = 1.8000 | $n_{d11}$ = 1.58423 | $v_{d11}$ = 30.49 |
| $r_{12}$ = 8.8451 | $d_{12}$ = 21.9300 | | |
| $r_{13}$ = INF (Exit pupil) | | | |

| | Diopter | | |
|---|---|---|---|
| | +1.0 | −1.0 | −3.0 |
| D1 | 2.88602 | 3.26619 | 3.71391 |
| D2 | 2.77354 | 2.39347 | 1.94744 |

| Aspherical coefficients | | | | |
|---|---|---|---|---|
| Surface No. | k | $A_4$ | $A_6$ | $A_8$ |
| 9 | 0 | $1.9502 \times 10^{-6}$ | $-2.0711 \times 10^{-8}$ | $1.0096 \times 10^{-10}$ |
| 11 | 0 | $1.1485 \times 10^{-4}$ | $-5.8005 \times 10^{-7}$ | $1.5471 \times 10^{-9}$ |

-continued fF = 35.0 mm
fN = −58.0 mm
fe = 48.0 mm
Y = 20.5 mm (V = 12.3 m, H = 16.4 mm)
fF/fe = 0.73
fN/Y = −2.83
H/V = 1.33

Fifth Embodiment

Figure 12:
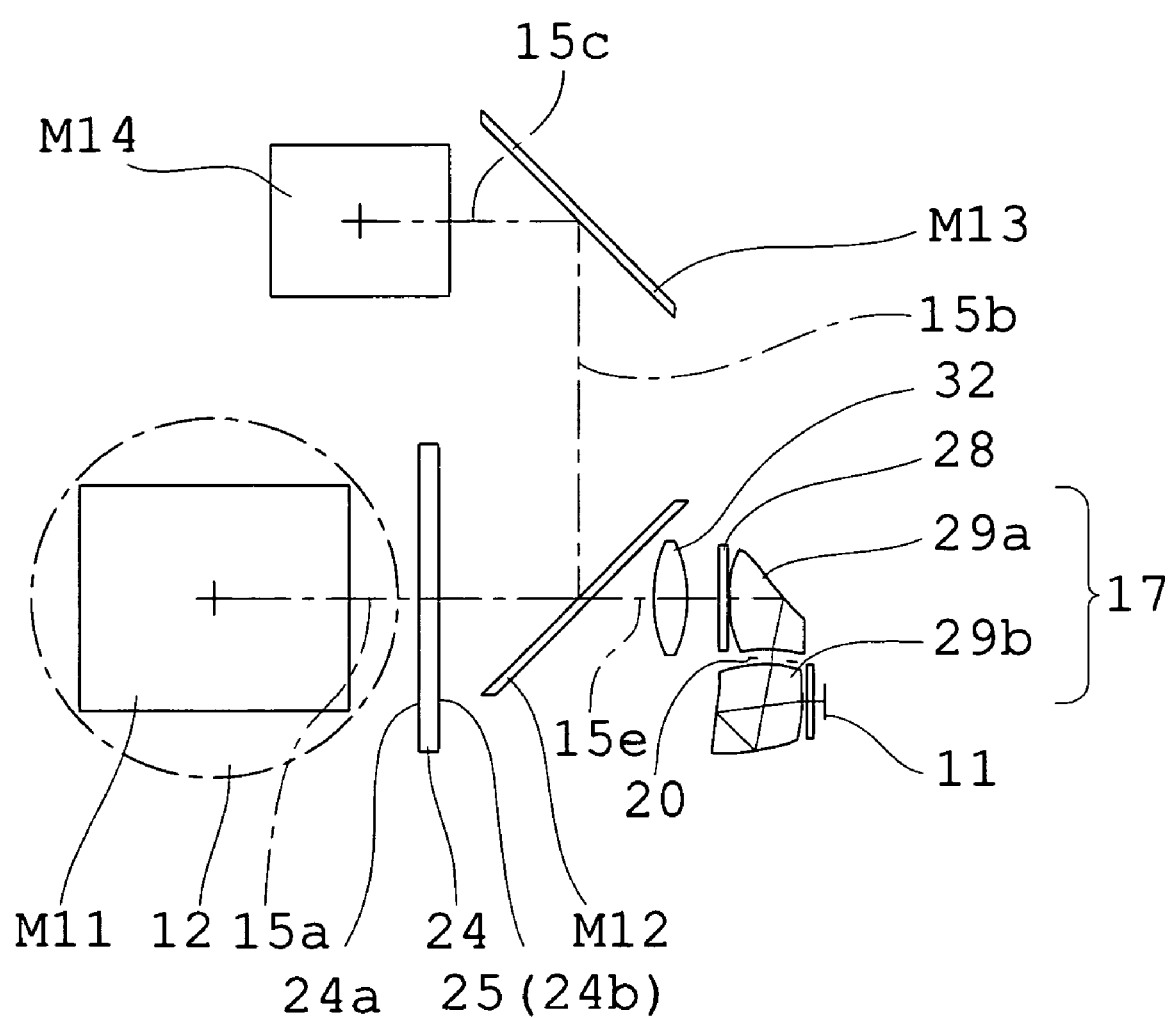
FIG. 12 is an explanatory view showing the layout, viewed from the object side, of the digital single-lens reflex camera of a fifth embodiment in the present invention.

FIG. 12 shows the layout of the digital single-lens reflex camera of the fifth embodiment in the present invention.

As shown in FIG. 12, the digital single-lens reflex camera of the fifth embodiment of the present invention has the fundamental arrangement of the observation optical system of the digital single-lens reflex camera in the present invention shown in FIGS. 9A and 9B and is constructed so that a field lens with positive refracting power is interposed between the first reflecting surface M11 and the half mirror M12, and a biconvex positive lens 32 is interposed between the half mirror M12 and the imaging optical system 17.

In the digital single-lens reflex camera of the fifth embodiment, the negative lens 26 is not interposed between the half mirror M12 and the third reflecting surface M13, and hence the power of the field lens is adjusted to the eyepiece system 10. The biconvex positive lens 32 is interposed between the half mirror M12 and the imaging optical system 17. Whereby, even when it is difficult that an image is formed on the light-receiving element 11 by only two prisms 29a and 29b, the power of the field lens is compensated so that the image is formed on the light-receiving element 11. Since it is desirable that the positive lens 32 is located close to the intermediate image plane 16 so that its effect can be optimized as the field lens, the positive lens 32 is placed immediately behind the half mirror M12.

Sixth Embodiment

Figure 13:
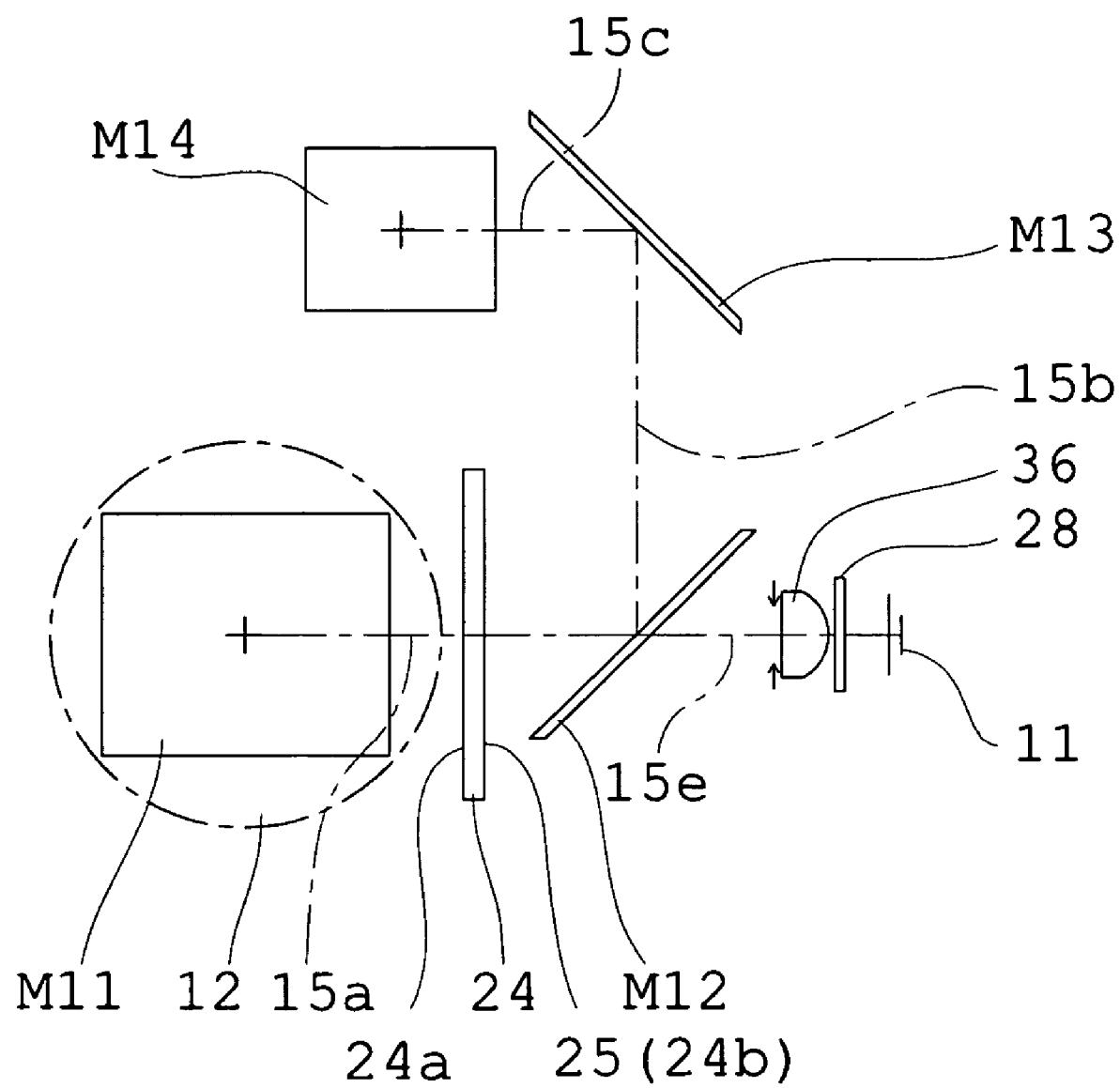
FIG. 13 is an explanatory view showing the layout, viewed from the object side, of the digital single-lens reflex camera of a sixth embodiment in the present invention.

FIG. 13 shows the layout of the digital single-lens reflex camera of the sixth embodiment in the present invention.

As shown in FIG. 13, the digital single-lens reflex camera of the sixth embodiment of the present invention has the fundamental arrangement of the observation optical system of the digital single-lens reflex camera in the present invention shown in FIGS. 9A and 9B and is constructed so that the field lens with positive refracting power is interposed between the first reflecting surface M11 and the half mirror M12.

In the digital single-lens reflex camera of the sixth embodiment, the imaging optical system 17 is placed as a photometric optical system constructed with a positive single lens 36 whose light-receiving-side surface is convex.

In the digital single-lens reflex camera of the sixth embodiment, it is not necessary that the image of the intermediate image plane 16 formed on the screen surface 24b is formed to the most peripheral portion of the image in the photometric optical system. Thus, the power of the field lens adjusted to the observation optical system is satisfactory for the refracting power between the half mirror M12 and the photometric optical system.

Seventh Embodiment

Figure 14:
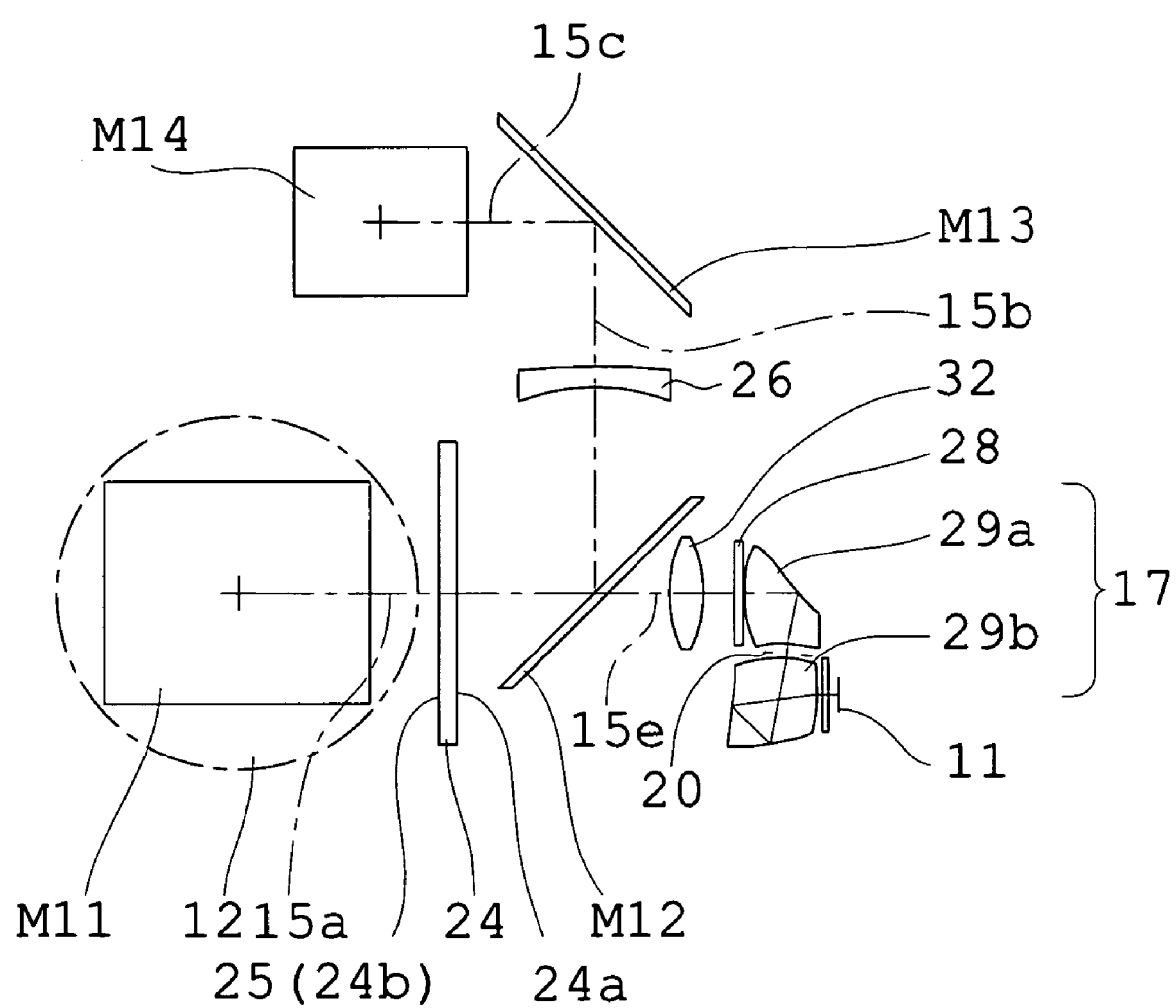
FIG. 14 is an explanatory view showing the layout, viewed from the object side, of the digital single-lens reflex camera of the seventh embodiment in the present invention.

FIG. 14 shows the layout of the digital single-lens reflex camera of the seventh embodiment in the present invention.

Figure 15:
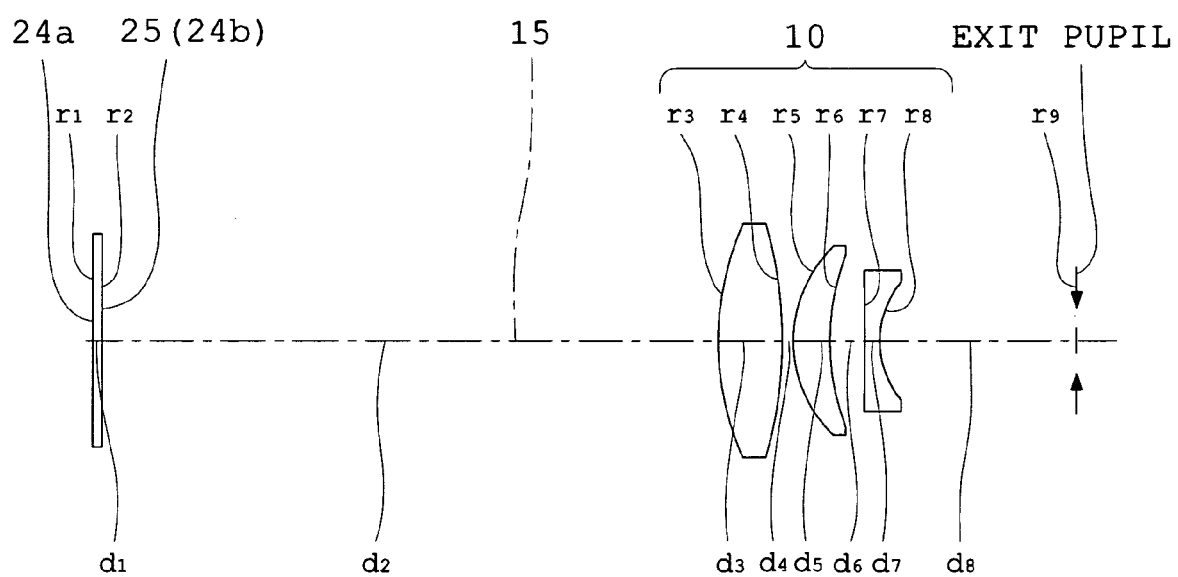
FIG. 15 is a sectional view showing an optical arrangement ranging from a Fresnel lens surface to the exit pupil, developed along the optical axis, by eliminating the first reflecting surface, the second reflecting surface, the third reflecting surface, and the fourth reflecting surface from the observation optical system of the digital single-lens reflex camera of each of the fifth and sixth embodiments.

FIG. 15 shows an optical arrangement ranging from a screen surface 24b to the exit pupil, developed along the optical axis, by eliminating the first reflecting surface M11, the second reflecting surface M12, the third reflecting surface M13, and the fourth reflecting surface M14 from the observation optical system of the digital single-lens reflex camera of the fourth embodiment.

As shown in FIG. 14, the digital single-lens reflex camera of each of the fifth and sixth embodiments of the present invention has the fundamental arrangement of the observation optical system of the digital single-lens reflex camera in the present invention shown in FIGS. 9A and 9B and is constructed so that a field lens with positive refracting power is interposed between the first reflecting surface M11 and the half mirror M12, and the meniscus-shaped negative lens 26 with negative refracting power, with a concave surface facing the object side, is interposed between the half mirror M12 and the third reflecting surface M13.

Subsequently, numerical data of optical members constituting the digital single-lens reflex camera of each of the fifth and sixth embodiments of the present invention are shown below.

The first surface of Numerical data 5 is the Fresnel lens surface 24a and the second surface of Numerical data 5 is the screen surface 24b. The first reflecting surface M11 is located on the object side of the first surface of Numerical data 5. The second reflecting surface M12, the third reflecting surface M13, and the fourth reflecting surface M14 are arranged between the screen surface 24b and the third surface of Numerical data 5.

The lens of the eyepiece system 10 is moved to make the diopter adjustment. When the diopter ($m^{-1}$) of Numerical data 5 is adjusted to +1.0 diopter, the spacing D1 is 0.68989 mm and the spacing D2 is 4.91664 mm. When the diopter ($m^{-1}$) is adjusted to −1.0 diopter, the spacing D1 is 1.47951 mm and the spacing D2 is 4.12931 mm. When the diopter ($m^{-1}$) is adjusted to −3.0 diopter, the spacing D1 is 2.41983 mm and the spacing D2 is 3.18669 mm.

The Fresnel lens 24 is designed to have the focal length fF of 70 mm. The optical system including the Fresnel lens 24, the second reflecting surface M12, the negative lens 26, the third reflecting surface M13, and the fourth reflecting surface M14, located behind the intermediate image, is designed to have the focal length fe of 50.0 mm. The length V of the minor side of the intermediate image plane 16 is 12.3 mm, while the length H of the major side of the intermediate image plane 16 is 16.4 mm. The diagonal length Y of the intermediate image plane 16 in this case is such as to be 20.5 mm. The ratio of the focal length fF of the Fresnel lens 24 to the focal length fN of the negative lens 26 is 1.40. The ratio of the focal length fN of the negative lens 26 to the diagonal length Y of the intermediate image plane 16 is −2.83. The ratio of the length H of the major side of the intermediate image plane 16 to the length V of the minor side of the intermediate image plane 16 is 1.33.

Also, the positions of the screen surface 24b and the Fresnel lens surface 24a may be reversed so that the first surface is configured as the Fresnel lens surface 24a and the second surface is configured as the screen surface 24b.

Numerical Data 5

$r_1$ = INF          $d_1$ = 1.5000       $n_{d1}$ = 1.51633   $v_{d1}$ = 64.14
(Fresnel lens surface)
$r_2$ = INF          $d_2$ = 73.2400
(Screen surface)
$r_3$ = 36.1201      $d_3$ = 7.4725       $n_{d3}$ = 1.51633   $v_{d3}$ = 64.14
$r_4$ = −55.8429     $d_4$ = D1 (variable)
$r_5$ = 16.1794      $d_5$ = 4.2709       $n_{d5}$ = 1.77250   $v_{d5}$ = 49.60
$r_6$ = 29.1531      $d_6$ = D2 (variable)

-continued

| | | | |
|---|---|---|---|
| $r_7 = -468.5107$ | $d_7 = 1.8000$ | $n_{d7} = 1.59270$ | $v_{d7} = 35.31$ |
| $r_8 = 11.5579$ | $d_8 = 3.1100$ | | |
| $r_9$ = INF (Exit pupil) | | | |

| Diopter | +1.0 | −1.0 | −3.0 |
|---|---|---|---|
| D1 | 0.68989 | 1.47951 | 2.41983 |
| D2 | 4.91664 | 4.12931 | 3.18669 | fF = 70.0 mm
fN = —
fe = 50.0 mm
Y = 20.5 mm (V = 12.3 mm, H = 16.4 mm)
fF/fe = 1.40

Also, the direction of retirement of the quick-return mirror M11 may be either horizontal or vertical to the incident optical axis 14.

In each of the embodiments, when the light-receiving element 11 is replaced by a light-emitting element, the visual field can be displayed on the screen surface 24b. For example, when red light is projected in a focusing area on the screen surface 24b, the focusing area is easily recognized.

When the imaging optical system 17 is constructed so that the optical path is split on the rear side thereof, both the light-receiving element 11 and the light-emitting element can be arranged so that the functions of both elements can be performed independently or simultaneously.

When the digital single-lens reflex camera according to the present invention is used, either the digital single-lens reflex camera that is advantageous for any of measurement, observation, and display, free of parallax, and is favorable for the slim design of the camera or facilitates the suppression of the projection or the digital single-lens reflex camera that it is possible to determine photographic composition while observing the object due to the through image, or both, can be provided.

What is claimed is:

1. An eyepiece comprising, in order from an object side toward a pupil side:
   a first lens with positive power;
   a second lens with positive power; and
   a third lens with negative power,
   the first lens being a positive meniscus lens having an object-side refracting surface convex toward the object side and a pupil-side refracting surface concave toward the pupil side,
   the eyepiece failing to have a fourth lens.

2. An eyepiece according to claim 1, satisfying the following conditions:

$$0.6 < f1/f < 1.2$$

$$-2.0 < f1\text{-}2/f3 < -1.0$$

$$-0.45 < f3/f < -0.25$$

where f1 is a focal length of the first lens; f1-2 is a combined focal length of the first lens and the second lens in a state, if the eyepiece has a variable focal length, where a diopter is −1 $m^{-1}$; f3 is a focal length of the third lens; and f is a focal length of an entire system of the eyepiece in a state, if the eyepiece has a variable focal length, where the diopter is −1 $m^{-1}$.

3. An eyepiece according to claim 1, satisfying the following condition:

$$0.6 < f1/f < 1.2$$

where f1 is a focal length of the first lens; and f is a focal length of an entire system of the eyepiece in a state, if the eyepiece has a variable focal length, where a diopter is −1 $m^{-1}$.

4. An eyepiece according to claim 1, satisfying the following condition:

$$-2.0 < f1\text{-}2/f3 < -1.0$$

where f1-2 is a combined focal length of the first lens and the second lens in a state, if the eyepiece has a variable focal length, where a diopter is −1 $m^{-1}$; and f3 is a focal length of the third lens.

5. An eyepiece according to claim 1, satisfying the following condition:

$$-0.45 < f3/f < -0.25$$

where f3 is a focal length of the third lens; and f is a focal length of an entire system of the eyepiece in a state, if the eyepiece has a variable focal length, where a diopter is −1 $m^{-1}$.

6. An eyepiece according to claim 1, satisfying the following condition:

$$-3.0 < (r1+r2)/(r1-r2) < -1.01$$

where r1 is a paraxial radius of curvature of the object-side refracting surface of the first lens and r2 is a paraxial radius of curvature of the pupil-side refracting surface of the first lens.

7. An eyepiece according to claim 1, wherein at least two of the first lens, the second lens, and the third lens are made of plastic, and at least one refracting surface of the lenses made of the plastic is aspherical.

8. An eyepiece according to claim 1, wherein the second lens is moved along an optical axis to perform a diopter adjustment.

* * * * *